(12) United States Patent
Solomon

(10) Patent No.: US 8,194,118 B2
(45) Date of Patent: Jun. 5, 2012

(54) PERFORMANCE DISPLAY SYSTEM

(76) Inventor: Dennis J Solomon, Yarmouth Port, MA (US)

(*) Notice: Subject to any disclaimer, the term of this patent is extended or adjusted under 35 U.S.C. 154(b) by 627 days.

(21) Appl. No.: 11/358,847

(22) Filed: Feb. 18, 2006

(65) Prior Publication Data

US 2006/0139750 A1     Jun. 29, 2006

Related U.S. Application Data

(63) Continuation-in-part of application No. 11/149,638, filed on Jun. 9, 2005, now abandoned, and a continuation-in-part of application No. 10/941,461, filed on Sep. 15, 2004, now abandoned, and a continuation-in-part of application No. 10/385,349, filed on Mar. 10, 2003, now abandoned, and a continuation-in-part of application No. 10/307,620, filed on Dec. 2, 2002, now abandoned, and a continuation-in-part of application No. 10/172,629, filed on Jun. 14, 2002, now abandoned, and a continuation-in-part of application No. 09/793,811, filed on Feb. 24, 2001, now abandoned.

(60) Provisional application No. 60/212,315, filed on Jun. 16, 2000, provisional application No. 60/558,238, filed on Mar. 31, 2004.

(51) Int. Cl.
 *H04N 15/00*     (2006.01)
(52) U.S. Cl. ............................ 348/46; 348/42; 348/51
(58) Field of Classification Search ..................... None
See application file for complete search history.

(56) References Cited

U.S. PATENT DOCUMENTS

| | | | | |
|---|---|---|---|---|
| 4,421,486 A * | 12/1983 | Baldwin et al. | ................. | 434/44 |
| 5,630,659 A * | 5/1997 | Ronzani et al. | ................. | 353/15 |
| 5,897,192 A * | 4/1999 | Seufert | ........................... | 353/74 |
| 5,988,817 A * | 11/1999 | Mizushima et al. | ............ | 353/94 |
| 6,404,409 B1 * | 6/2002 | Solomon | ........................ | 345/31 |
| 6,496,598 B1 * | 12/2002 | Harman | ....................... | 382/154 |
| 7,182,151 B2 * | 2/2007 | Stump et al. | .................... | 175/45 |

* cited by examiner

*Primary Examiner* — Luong T Nguyen

(57) ABSTRACT

An Improved method and device for entertainment and the display of images incorporating the audience in a performance including the integration of independent,-mobile three-dimensional audience display elements. Improved methods for manufacturing an integrated visual display incorporating scanned light sources in the audience display elements.

4 Claims, 31 Drawing Sheets

PERFORMANCE DISPLAY SYSTEM

This present application claims the benefit and is a continuation-in-part of U.S. patent continuation-in-part application Ser. No. 11/149,638 filed in Jun. 9, 2005 now abandoned; Ser. No. 10/941,461 filed in Sep. 15, 2004 now abandoned; Ser. No. 10/385,349 filed on Mar. 10, 2003 now abandoned; Ser. No. 10/307,620 filed on Dec. 2, 2002 now abandoned; Ser. No. 10/172,629 filed on Jun. 14, 2002 now abandoned; Ser. No. 09/793,811 now abandoned filed on Feb. 24, 2001; and of provisional patent application 60/212,315 filed Jun. 16, 2000 and 60/558,238 filed Mar. 31, 2004 which are incorporated herein in their entirety by reference.

TECHNICAL FIELD

This invention relates generally to performance display devices and more particularly to multi-phasic imaging displays.

BACKGROUND ART

The engagement of the audience in a display environment has been the goal of inventors since the origins of art. Significant advances in the displays have been accomplished including cycloramas, integral photography, and holography. Audience participation, as an active part of the environment special effect has never been perfected, and display systems which function independently and in concert, have not been substantially developed until the disclosure of my special effects display device in the parent U.S. patent application Ser. No. 09/250,384, now U.S. Pat. No. 6,404,409. A few inventions have been proposed which have generally been too complicated to be reliable, expensive to manufacture, without sufficient resolution, or sufficient stability to gain any acceptance. None have combined a directional projector and an active, responsive display unit which may be in the control of each member of the audience or used independently.

One technological approach—the presentation of visual images by moving display elements—has a long and crowded history. Following the development of light emitting diodes (LEDs), a large variety of displays, games, audience units and yo-yos have been manufactured, publicly presented and patented. These inventions strobe arrays of individual light elements or pixels as the array is displaced cyclically, producing an image or pattern due to the persistence phenomenon of human vision. Francis Duffy in his U.S. Pat. No. 3,958,235 discloses linear audience unit of LEDs oscillated by a door buzzer electromagnetic actuator. He specifically indicated that a manual actuator may be used. Edwin Berlin in his U.S. Pat. No. 4,160,973 extended the work of Duffy to both 2D & 3D devices using "rotational" or "short-distance oscillatory motion" with extensions of Nipkow's disc television. Berlin also disclosed the use of moving digital memory and electronics and a "single pulse (per cycle) which adjusts the frequency of a clock (controlling the timing of each LED)". Bill Bell is his U.S. Pat. No. 4,470,044 disclosed a single stationary array of LEDs with "saccadic eye movement" timing with non-claimed references to applications including audience units, tops and bicycles.

Marhan Reysman in his U.S. Pat. No. 4,552,542 discloses a spinning disc toy with a centrifugal switch causing a light to be illuminated. It follows a line of inventions related to tops and yo-yos. Hiner is his U.S. Pat. No. 4,080,753 discloses a toy flying saucer with a centrifugal motion sensor.

The techniques of Duffy, Berlin & Bell were applied to handheld audience units differentiated from the prior art by the detailed centrifugal switch design. Tokimoto is his U.S. Pat. No. 5,406,300 discloses a audience unit with a Hall effect acceleration sensor. Sako in his U.S. Pat. No. 5,444,456 uses an inertial sensor having "a pair of fixed contacts and a moveable contact" to adjust the clock of the display electronics. While inventive and functional, the Sako design remains awkward and requires considerable energy to maintain an image. For these reasons, it is unsuitable for entertainment, marketing and game applications.

At many events from the mid-1980s, these and simpler visual and audio producing items have been combined with non-directional, wireless signals to produce a global special effects. As disclosed in Bell's U.S. Pat. No. 4,470,044, these technologies may be affixed to bicycles and motorized vehicles, to clothing, audience units, yo-yos and other accessories.

Additionally, wireless technologies have been applied to visual and audio producing proximity devices such as dance floors—U.S. Pat. No. 5,558,654, pagers—U.S. Pat. No. 3,865,001, top hats—U.S. Pat. No. 3,749,810, and clothing—U.S. Pat. No. 5,461,188 to produce a global synchrony and pre-programmed or transferred effects.

None of these or the other prior art has successfully addressed the problem of providing low cost, real-time, precision control of audio or visual effects such that an affordable uniform appliance distributed, affixed, attached, accompanying or held by each member of an audience or group would seamlessly, and without error, integrate in a global screen or orchestra in real-time.

None of the prior inventions was capable of independent and concerted three-dimensional visual effects. None permitted the simultaneous registration of all units. Further, a number of other problems have remained including the development of switching methodology which permits a static on-off state, display freedom from inertial changes, a frame of reference and global orientation.

This inventor has a long history of invention in these relative fields of persistence of vision, three dimensional and professional stage, film and event special effects. His U.S. Pat. No. 4,983,031 (1990) discloses a method of data display control and method for the proper display of images to all observers in both directions for projection and LED moving displays—technologies chosen by the U.S. Department of Defense for advanced airspace control. His U.S. Pat. No. 4,777,568 (1988) and U.S. Pat. No. 4,729,071 (1987) disclose a high speed, low inertial stage scanning system —currently in use by major international touring music and theatre acts. Further background audience display systems are also described in the my parent U.S. Pat. No. 6,404,409.

SUMMARY OF THE INVENTION

The present invention discloses an improved and versatile performance display systems which includes a method and device for the low cost, real-time, precision control of audio or visual effects such that an affordable uniform appliance distributed, affixed, attached, accompanying or held by each member of an audience or group would seamlessly, and without error, integrate in a global screen or orchestra in real-time.

Additionally, an object of the invention is an improved motion switching method for the audience unit including a frame of reference to global orientation.

Another object of the invention is a reduction in the cost and energy required to operate the performance audience unit system.

A further object is the application of the invention to independent displays for all purposes.

The above and still further objects, features and advantages of the present invention will become apparent upon consideration of the following detailed disclosure of specific embodiments of the invention, especially when taken in conjunction with the accompanying drawings, wherein:

FIG. 1 presents a perspective view of the generalized performance display system.

FIG. 2 presents a side view of a generalized data and image projector.

FIG. 3 presents a scanning projection correction method.

FIG. 4 presents a front view of a generalized audience unit.

FIG. 5 presents a perspective view of a generalized banner audience unit.

FIG. 6 presents a perspective view of a generalized spinner audience unit.

FIG. 7 presents a top view of a generalized snap attachment for the audience unit.

FIG. 8 presents a perspective view of a generalized ball or balloon audience unit.

FIG. 9 presents a perspective view of a generalized volumetric audience unit.

FIG. 10 presents a top view of a volumetric emitter element.

FIG. 11 presents a perspective view of a scan multiplier of a volumetric audience unit.

FIG. 12 presents a perspective view of an alternative scan multiplier.

FIG. 13 presents a perspective view of a generalized autostereoscopic audience unit.

FIG. 14 presents a top view of a lenticular emitter element.

FIG. 15 presents a top view of a saccadic enhancement.

FIG. 16 presents a top view of a scan multiplier applied to an autostereoscopic audience unit.

FIG. 17 presents a top view of a generalized registration beacon for the audience unit.

FIG. 18 presents a top view of an alternative generalized registration beacon system.

FIG. 19 presents a top view of an alternative generalized registration beacon system.

FIG. 20 presents a perspective view of an array of spaced-apart generalized audience units.

FIG. 21 presents a perspective view of a generalized projection wall.

FIG. 22 presents a side view of a generalized scanning projection wall.

FIG. 23 presents a front view of a transform aperture array of the projection wall.

FIG. 24 presents a front view of another transform aperture array of the projection wall.

FIG. 25 presents a side view of a generalized compact scanning projection wall.

FIG. 26 presents a perspective view of an transform optics of the projection wall.

FIG. 27 presents a front view of resolution multiplier method.

FIG. 28 presents a front view of resolution multiplier method.

FIG. 29 presents a front view of resolution multiplier method.

FIG. 30 presents a front view of resolution multiplier method.

FIG. 31 presents a perspective view of a track and communications systems.

DETAILED DESCRIPTION OF THE INVENTION

FIG. 1 presents the generalized elements of the performance display system 10 in a venue 22 resembling a stage 24. The venue 22 may include any space ranging from an automobile to sporting event venue 20 such as at a football stadium.

Although the term audience unit 200 is used to describe the simple and autostereoscopic-effects unit, it may be understood that the module may take any shape or be incorporated into any independent handheld, worn, or positioned effects device including but not limited to tickets, badges, buttons, globes, cylinders, signs, sashes, headdresses and emblems affixed to any object, moveable or stationary.

The insert in FIG. 1 presents a front view of the present invention having an illuminated audience unit 200 with some or all of the elements of the audience unit of FIG. 1, having one or more light emitting elements 206, a connecting member 214, handle 212 and an active receiver 202 capable of receiving optical or acoustic signals.

In operation, the show director at the control board 18 or instrument sends a sequence of commands, live or from a stored visual or audio program, over the performance system data network 14 to the projector 100 which emits a precisely timed series of directional signals 106, 106", 106" programmed to activate the audience units 200 at a precise location impacted by the directional signal 106. In its simplest embodiment, the projector 100 displays an invisible IR 106 image at a specific wavelength (880 nanometers, for example) on the audience 22 which causes the wavelength-specific audience unit communication receiver 202 to activate one or more light emitters or modulators 206. The projector 100 may also transmit a program sequence for later execution and display. Each audience unit may contain a unique encoded identifier entered during manufacture; at the time of purchase or distribution; or transmitted by the projection system to the audience at any time, including during the performance. The data protocol may included well-known communication protocols such as but not limited to IR RS-232, IRDA, Fiber Channel, Fiber Ethernet, etc.

The projector may also project a visible light beam containing visual content as well as a data stream by modulating the frequency above the human visual system integration frequency of 30 Hz FIG. 2 present a simplified embodiment of the projector 100 element having one or more data and/or light emitters/sources 102/104, an visible light modulator 112, an data modulator 110, an combiner 114, a lens projection system 118, a beam scanning system 120 and a mounting system 122. In operation, the projector 100 projects a temporally and spatially modulated data and/or visible image 106/108 in response to commands from the control system. The internal and networking optics/electronics are not shown but may include the well-known elements in networked or independent digital video projectors.

FIG. 3 presents a depiction of a rapidly scanning projector 100 projecting an image 124, 124' which would normally appeared blurred, or have its data scrambled, due to the rapid motion. A motion-defined distortion 126 of the static image 124" may be introduced to correct this problem. Adjustments for chromaticity and brightness may also be employed.

FIG. 4 presents a simplified embodiment of the audience unit 200 which is representative but not limiting of the handheld embodiment of the audience unit may include a communication receiver 202, a microcomputer 204 which may be combined with the communication receiver 202, least one LED or light modulator 206, and a power source 210 which may included but is not limited to a small battery, a photovoltaic cell, a mechanical, chemical or piezo-electric electrical generator, etc. This unit may be part of the event ticket, sandwiched between layers of paper, and as a button, pen, necklace, earrings or adhesive sticker, for example. A sound emitter acoustic speaker 208 may be included in the unit 200.

One example of the low cost and simple construction of the preferred embodiment employs a supporting plastic tube 212, an IR receiver 202 used in TV remote controls, a Microchip PIC microprocessor 204, a linear array of light emitting diodes (LEDs) or reflective E*Ink light modulators 206, and a 3V disk battery, mounted on a mounted on FP4 circuit board. A lanyard may be provided. In operation, the unit 200 may be held stationary and employ a complex saccadic image disclosed by Bill Bell. Additionally, the unit 200 may be placed on a fixed or moving base structure.

Utilizing the novel features disclosed in the present invention, the visual and audio response is precise and independent of the dynamic location of the member of the audience or audience unit. Further, as a further benefit of the novel features and combinations of the present invention, the cost of implementing the method of the present invention is substantially less than other approaches and for the first time, practical and competitive in the marketplace. The performance audience unit display system may be employed at any assembly, large or small, or applied to any structure. Also, the audience unit display may be incorporate a message, song or game, and continue to operate after or independent of a performance or assembly.

FIG. 5 present a generalized banner embodiment of the active audience unit 200 showing the communication receiver 202, one or more light emitting/modulator elements 206, and a pressure/location switch 220 which is activated when the banner is waved and controls the timing and direction of the image displayed. The other previously-described elements, such as the computer, power source, sound emitter/speaker, and handle which may be incorporated, are not shown in this and following figures.

FIG. 6 presents an embodiment of a spinner-type audience unit 200 shown as having an array of LEDS 206 which rotably attached to a handle 212 by rigid, flexible or folding connecting member 214. The insert shows a top view of the trigger sensors or switches 222 which may include a multiplicity of irregularly spaced switches 222', 222", 222‴. The irregular timing pattern produced during a regular rotation may be used to determine direction and orientation of the unit 200.

FIG. 7 shows a top view of the clip-on embodiment of the spinner-type audience unit of FIG. 6 where the timing switch 222 is integrated with at least one pair of snap contacts 222', 222" on the handle end 212 of the connecting member 214 which close a circuit with handle contact 238. The contact 238 may extend to include an upper and lower connecting member 214, if two, rather than one, are used. Multiple contact regions 238 may be employed to enable irregularly spaced switches as described in FIG. 6.

FIG. 8 shows a balloon or ball embodiment of the audience unit 200 having a clear, translucent, or opaque surface 208, one or more light modulators 206 and the data receiver 202. In the airborne balloon embodiment, the receiver 202 may be positioned at the bottom of a handle which may incorporate the light emitter 206, microcomputer and power supply and shift the center of gravity of the unit 200 such that when released the receiver 202 is oriented at the bottom of the unit 200. The light/color emitters/modulators 206 may be placed on the surface (including constituting the polymer surface) or internally. Elements causing rotation, sound, scent and vibration may be incorporated.

FIG. 9 shows an audience unit 200 with a rotating light array 206 mounted on a position encoder (such as an incremental or absolute optical encoder) affixed to the handle 212.

In operation, the individual light elements of the array 206 may be modulated to produce a three-dimensional volumetric or autostereoscopic image.

The audience unit may be used independently as a display.

FIG. 10 shows a top view of individual element 206 having controllable projection sectors 232. The sectors may be utilized to produce three-dimensional images with improved readability, occlusion and stereoscopic image disparity. A vertical, central, narrow sector 232 may be used to enable an autostereoscopic mode, while the right/left sectors 232', 232" may be used to present hemispheric limited images to observers.

With a fine resolution, occlusion and multiple autostereoscopic modes may be programmed. The fine resolution may include X-Y sectors similar to integral photography.

FIG. 11 shows an audience unit 200 with a rotating light array 206 having a scan multiplier 240 in the form of a reflective lenticular array. A transmissive embodiment may also be employed. A reflective or transmissive integral photographic array may be employed with the image scanning in two-dimensions. In operation, the projection of the light array 206 is scanned by the scanner 242, shown on a distal arm affixed to the scan multiplier 240, but may be placed in any beam path position, resulting in a multiplicity of directional beams FIG. 12 shows an audience unit 200 with a rotating light array 206 having a scanner 242 in the form multiplier in the form of a static reflective or transmissive lenticular-type array upon which the projection of the light array 206 is directed. Each sector 242' of the static scanner 242 may describe a full or partial traverse of the image screen 246.

FIG. 13 shows an audience unit 200 in the form of autostereoscopic column having a light array 206, a view aperture 224 and a handle 212. The unit may be used in a moving, static or saccadic mode. Internal motion sensors, not shown, may automatically switch between modes.

FIG. 14 shows a top, cross-sectional view of the lenticular lens, light array embodiment of the autostereoscopic column showing the light array 206 and lenticular lens 224'. With the advances in the brightness and complexity of MOEMS technology, the miniaturization of the elements of the autostereoscopic unit is progressing rapidly. With the lenticular lens 224' is shown as anamorphic in the viewer's horizontal direction X, an X-Y construction may be employed resembling an ovoid lenslet for each element of the light array 206.

FIG. 15 shows a top, cross-sectional view of an autostereoscopic unit 200 showing the light array 206, view aperture 224, visual beams 208, and observers 30. An additional light element, the saccadic initiator 206', is shown which is used to initiate the observer's saccadic movement by preceding and alternating the display of the saccadic image.

While there are many methods to create the light array 206 ranging discrete LEDs to complex, rapidly scanned lasers, the global orientation of the individual units 200 is extremely important in order to display a composite, group image containing stereoscopic image disparity.

FIG. 16 shows a top, cross-sectional view of an autostereoscopic unit 200 showing an scan multiplier in the form of a reflective lenticular-type 240 which directs the image of the light array 206 scanned by scanner 242 on image screen 246. In operation as shown in the figure, a scan rate of 30 Hz may be multiplied eight times with the proper coordinate modulation of the light array 206. In all the embodiments of the present invention, the feedback sensors or orientation receivers may be employed to improve the performance.

FIG. 17 shows a top, cross-sectional view of an autostereoscopic unit 200 showing an orientation sensor 218 receiving the projection from an orientation beacon 16. The beacon 16 may be the image from a projector 100 or projector element 152.

FIG. 18 shows a top, cross-sectional view of an autostereoscopic unit 200 showing two orientation sensors 218, 218' receiving the projection from an orientation beacon 16 and interpolating the unit's orientation based on the relative intensity 218" of the sensors.

FIG. 19 shows a top, cross-sectional view of an autostereoscopic unit 200 showing orientation sensors 218 and scanner, 218' receiving the projection from an orientation beacon 16 determining the unit's orientation based on the scanner position.

FIG. 20 shows a perspective view of a multiplicity of autostereoscopic units 200, spaced apart, and networked to a central computer 204. Multiple units may be used to create an autostereoscopic screen, placed adjacent or with substantial spaced between each one. Saccadic timing may be employed to increase the apparent resolution.

FIG. 21 presents an important optical configuration applicable to all embodiments of beam holography necessary for a continuous image. This improvement may be incorporated in direct beam and all embodiments of scanning beam holography. Referring to FIG. 21, the projection wall 150 is comprised of an array of individual projection matrix elements or pixels 152, each of which projects a narrow projection beam 154 which scans across the audience observers 30, 30' at approximately 30 Hz or greater. The projection beam 154 may be a thin vertical line for horizontal image disparity. The scan field of view ranges from scan limits shown as scan limit locations feedback sensors 156' to 156. The scan field of view is partitioned into individual scenes, which may be defined by interpolating the signals from the corresponding feedback sensors 156, 156' at the scan limits to adjust the frequency and timing of the projection from each wall element 152. For a beam holographic view, each projected line and scene partition has an arc length less than the inter-ocular distance of approximately 2 inches at the maximum beam holographic viewing distance. At finer resolutions that detailed image disparity increases.

All number of novel and known scanning technologies may be employed to achieve this optical improvement. They include mechanical resonant or rotating mirrors, acousto-optic, electro-optic, or piezo-optic scanners, resonant displaced light sources and other known scanning methods. MEMS fabrication may be incorporated. A summary of techniques is discussed throughout. It may be understood that an alternative construction may substitute moving pixels for static pixel, and scanner mechanisms in all embodiments.

In all the discussed embodiments, the optical components may be substituted by reflective or transmissive elements, using fiber-optic, MEOMS, HOE, or micro-optic fabrication technologies known in the field.

The scanning method shown presents the audience with proper horizontal parallax. Vertical parallax may be presented by incorporating additional, independently modulatable domains, which project a uniquely composed projection line 24 above or below the principal line 154. The additional domains may be inculcated by additional discrete light sources with each pixel 152, or a vertical scanning mechanism.

In order to achieve high registration accuracy in a high-resolution system, partition feedback sensors 156, 156' are placed in the path of the projected beam. The sensors may be responsive to an infrared or other non-visible beam. The sensor output is transmitted to the image controller 30, which modulates the pixel 152 emissions. Various sensor methods may be employed including discrete partition sensors 156, 156', sensors at the scene field of view limits 156', 156 or other configurations. When employing discrete scene sensors the signal may be used to directly update the scene from an image buffer either in an incremental or absolute mode. When employing sensors at the scene field of view, the period between signals may be divided into partition periods, and the timing counter used to update the scene from an image buffer.

Each wall element 152 may be comprised of one or more pixel light sources and an individual or common horizontal scanner. A vertical scanner may be also be common to all pixels 152 or individually incorporated. An audience vertical field of view optical component in the form of a horizontal lenticular screen, which vertical expands the pixel into a projection line 154 may be included. Examples of the construction include a horizontally oriented lenticular screen, holographic optical elements, micro-fresnel or other micro-optical arrays.

FIG. 22 presents a side view, cross section of a linear screen pixel array, reflective embodiment of the present invention. A horizontal array of wall screen pixels 152 with internal horizontal scanning directs its beams 166 onto a vertical scanner 168. The beams 166 are directed to the display redirecting reflector 170' and onto the audience field of view optics 170 which expand the beam in the vertical. It may be understood that the audience vertical field of view optics 170 may be incorporated into, or affixed to the display redirecting reflector 168. Alternatively, the display redirecting reflector 168 may be incorporated into the view optics 170 as a reflective, refractive, or transmissive optical element. The vertical scanner 168 may be a rotating polygon, resonant mirror, acousto-optic, electro-optic, MEMS or other known combination of transmissive or reflective scanning devices. For a high resolution, 15024 vertical line, 1528 partition presentation, at the ergonomic 72 Hz refresh rate, the calculations of pixel modulation and scan frequency are as follows:

Pixel Modulation (9.4 MHz)=Refresh rate (72 Hz)×Vertical Lines (1024)×Partitions (128) This rate may be reduced by adding additional rows of the linear screen pixel arrays which project onto adjacent or interlaced vertical domains.

The perceived pixel intensity is the pixel flux×surface solid angle projection (surface (double) integral×Efficiency Factor/pixel area at the observer. This is approximately the same as if the pixel was placed in a static 2D screen.

FIG. 23 shows a static X/Y array of projection matrix elements 152 transformed into horizontal linear array of projection apertures 174 by optically integrating a sequence of diagonal-arranged elements 152.

FIG. 24 shows a static X/Y array of projection matrix elements 152 transformed into diagonal array of projection apertures 174 by optically integrating a sequences of horizontally-arranged elements 152.

An alternative approach (not shown) may employ a dove prism as the transform optic for an regular or offset matrix.

FIG. 25 presents a perspective view of the static Autoview reflector embodiment of the present invention. The purpose of the Autoview reflector invention is to eliminate the multiple, individual high frequency horizontal scanning and control elements required by the prior embodiments and permit a compact horizontal incidence displacement scanner.

A static horizontal array of wall screen pixels 152 may be employed which direct its beams 166 onto a vertical scanner 168. The vertical scanner 168 has an offset construction to both scan and displaced the virtual source, and directs the beam 166 to the Autoview optics 172. The Autoview optics 172 are further described in FIG. 26. The beams 166 are then directed to the display redirecting reflector 170 and onto the audience field of view optics 170 which expand the beam in the vertical.

FIG. 26 presents a perspective view of reflective embodiment of the Autoview optics of the present invention. The Autoview reflector 172 is constructed of Autoview reflector elements 172' having a continuous or incremental optical displacement (twist) which are configured to cause the input beams 166, 166' to deflect in different directions, based on the incident spatial position on the Autoview element 172'. It may be understood that the Autoview element 172 may be a continuous and incremental reflective surface, or in the reflective or transmissive embodiment constructed of a continuous or incremental holograms, holographic optical elements (HOEs), micro-optics, Fresnel, or other known static elements.

Registration and orientation sensors and feedback may be employed to improve performance.

It may be understood that while active Autoview reflector elements such as micromirrors, acousto-optic, or electro-optic beam scanner may be employed, they represent a distinct, separate and differentiable invention from the embodiments in the present application.

FIG. 27 shows a multiple column display 300 having a multiplicity of columns of emitters 310 (corresponding to projection matrix elements 152) with an intervening space filled with three virtual emitters 320, 320' 320". Bill Bell established that when multiple columns are placed with intervening spaces, the human vision system will integrate the image through saccadic motion and persistence of vision.

The quality of the perceived image is dependent on the timing and angular displacement of image real and virtual image, which Bell calculated from the normal saccadic angular velocity and period of visual integration. It works simply when the actual and virtual images 320 of the multiplicity of emitter columns 310 are consistent in timing and direction. When they are complex however, other useful effects occur, including a perceived increase in visual resolution, color depth and intensity and three-dimensional perception.

Figure 1:
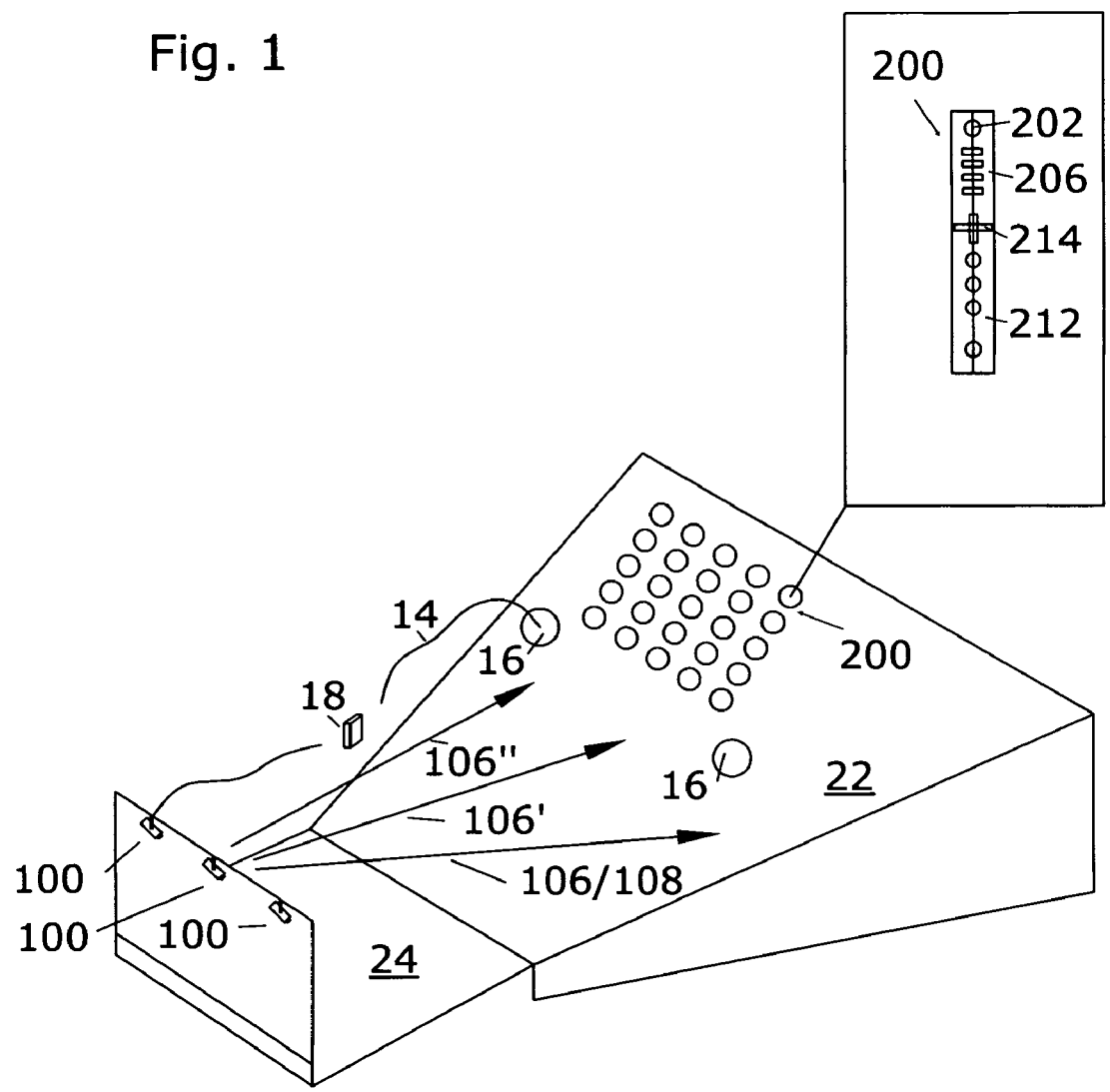
Figure 2:
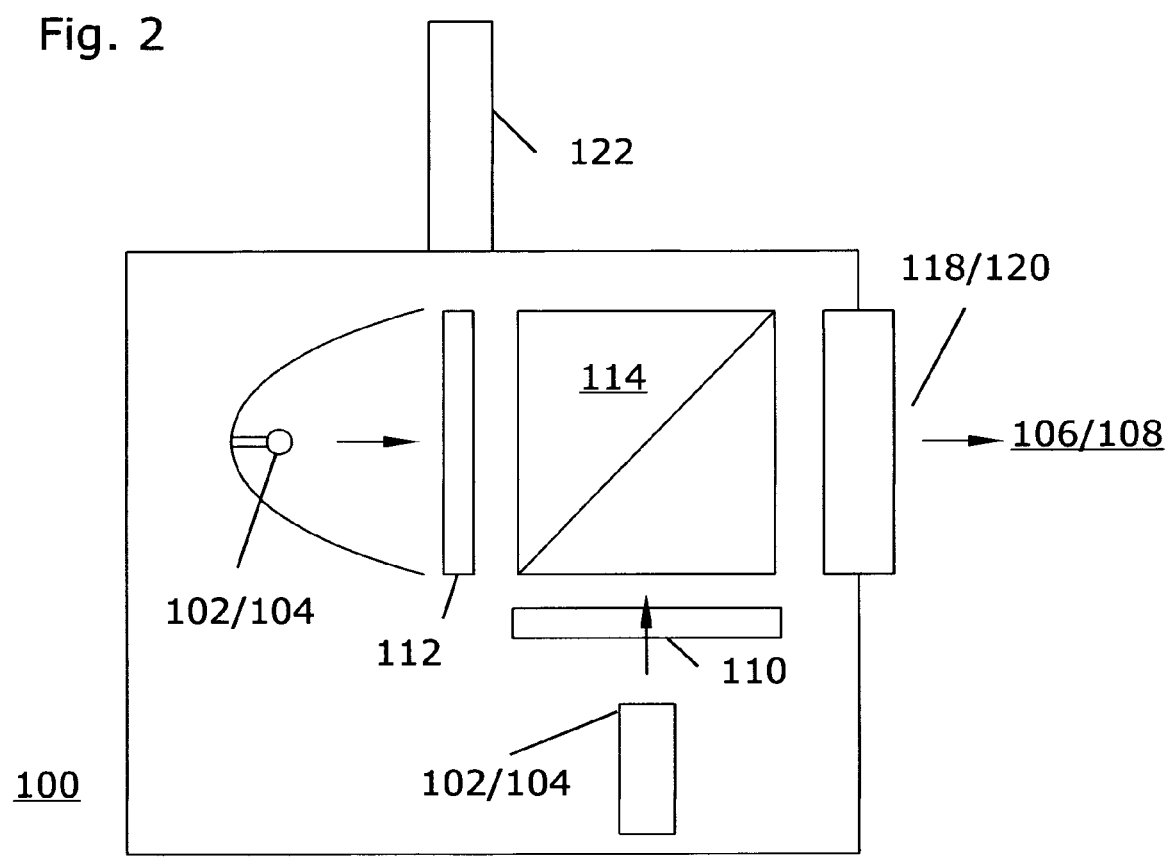
Figure 3:
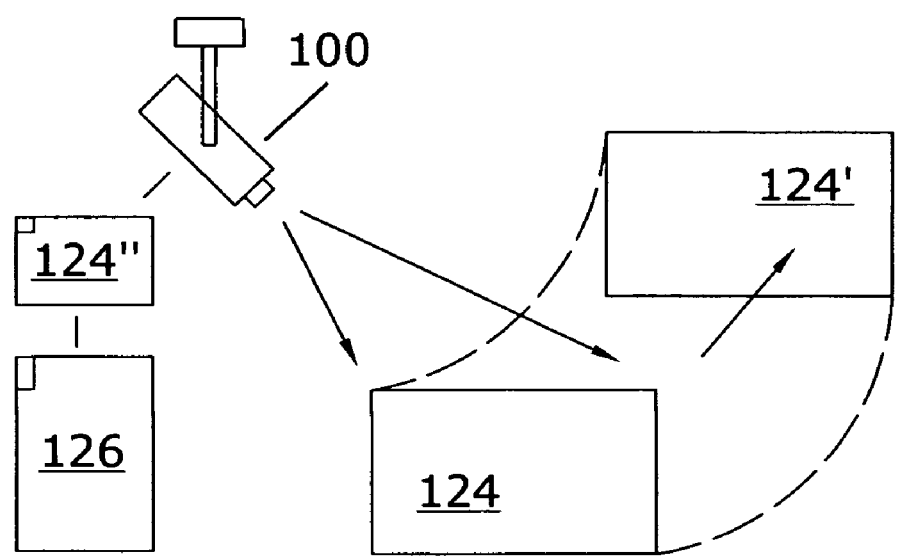
Figure 4:
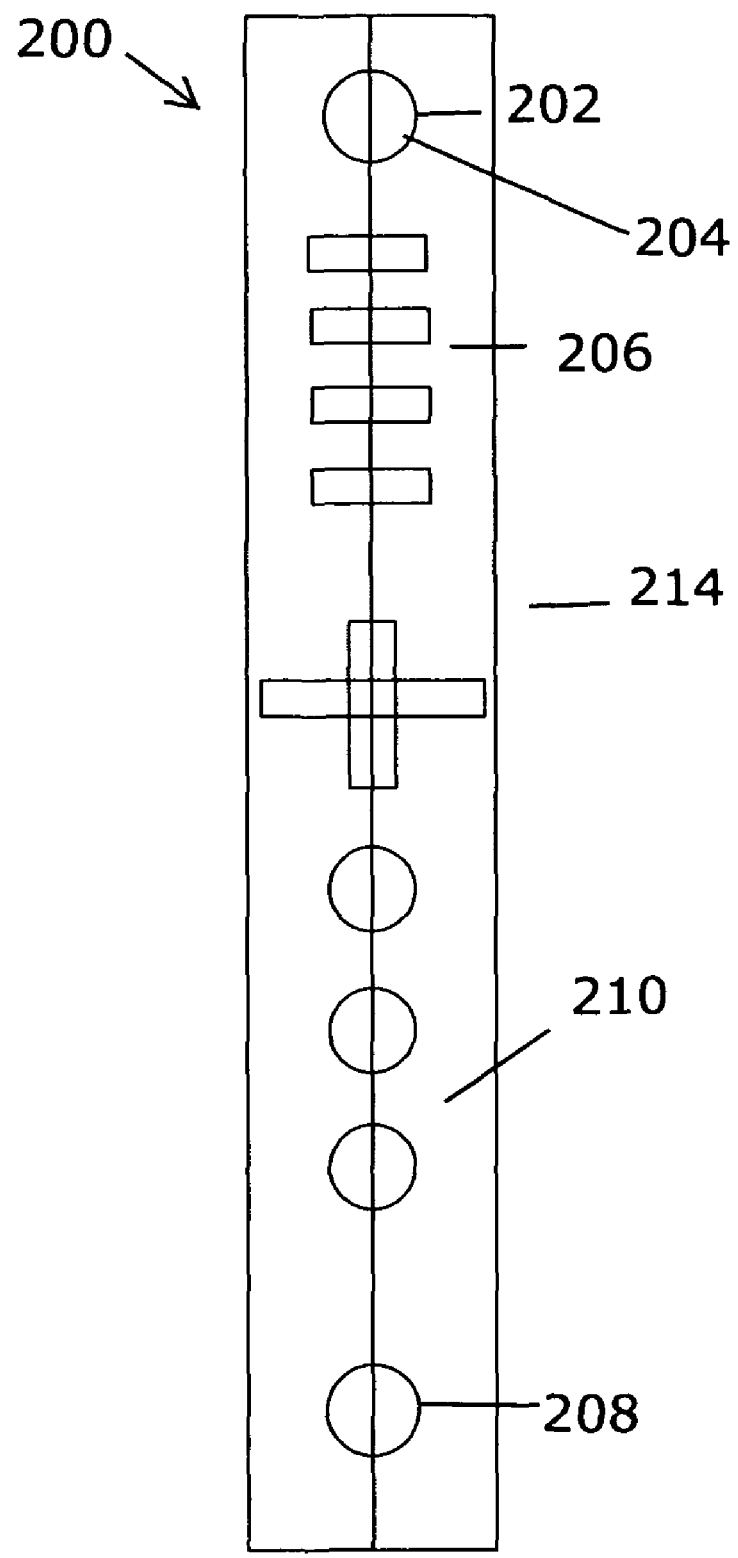
Figure 5:
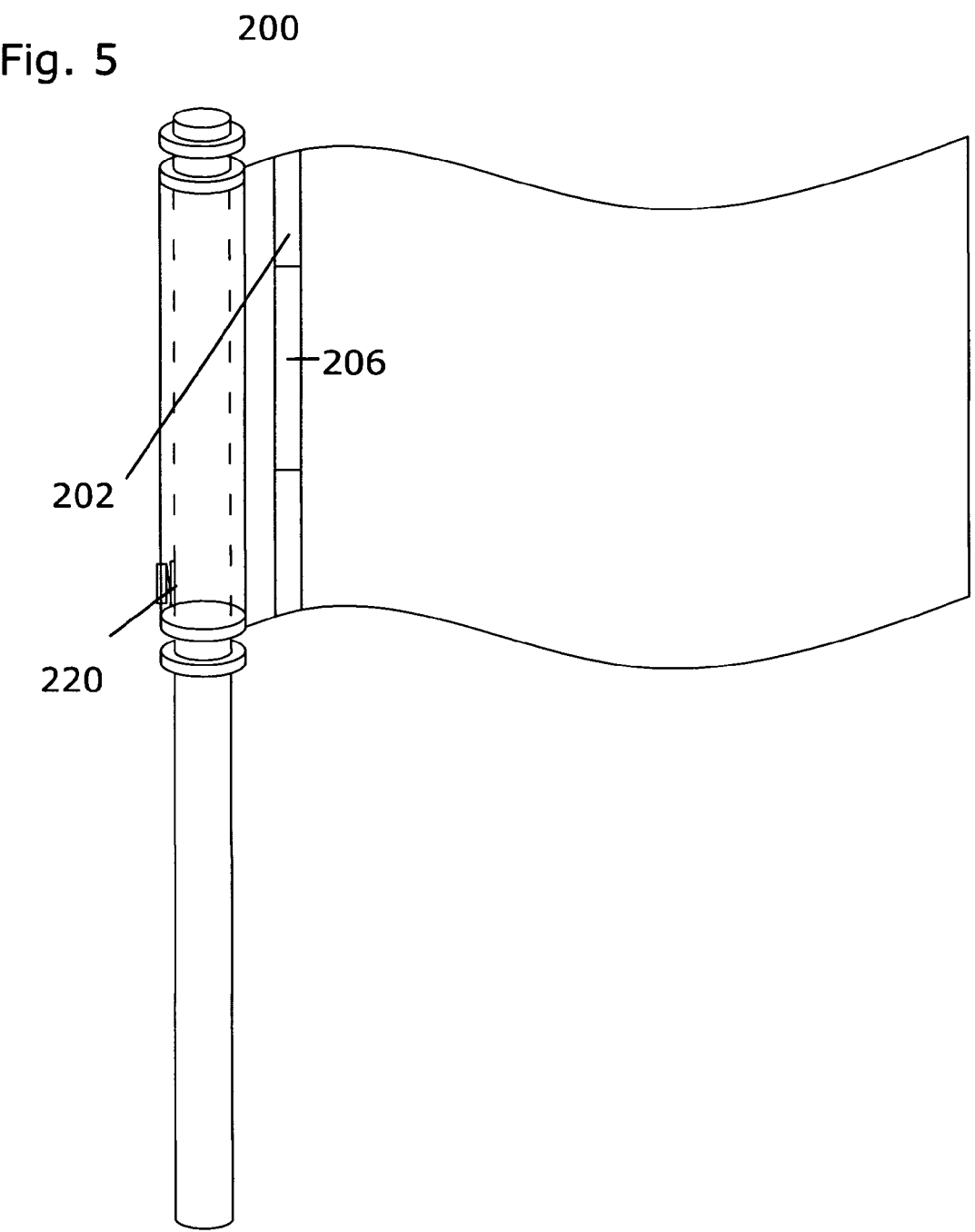
Figure 6:
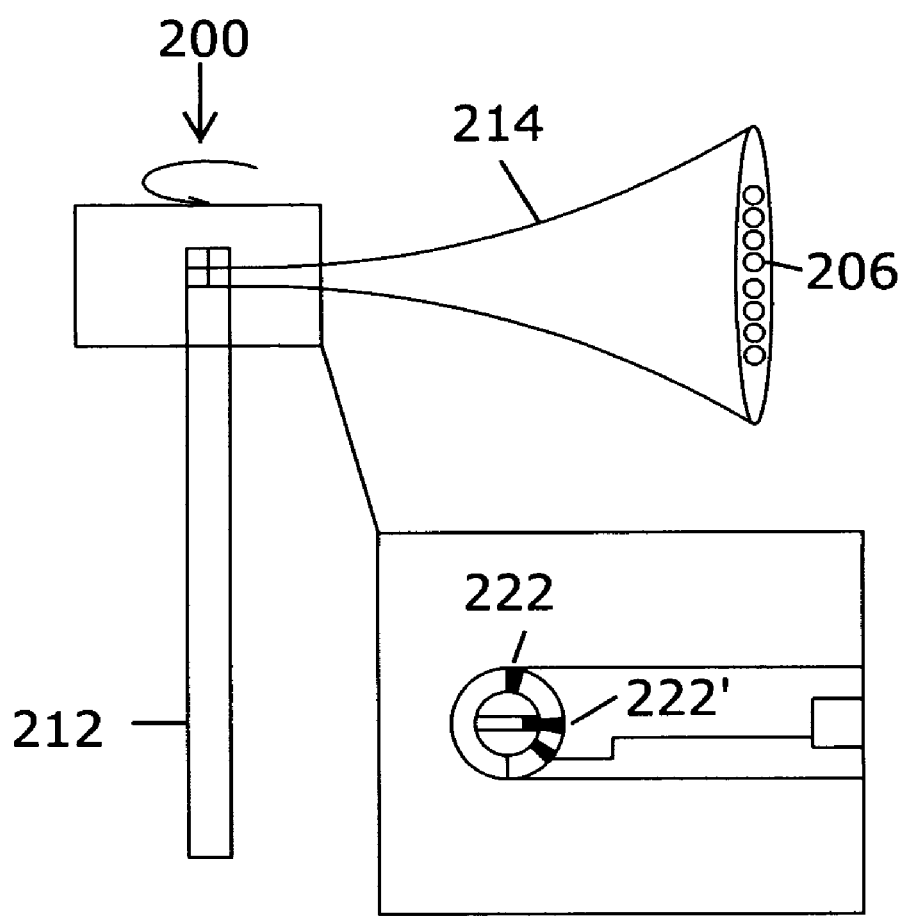
Figure 7:
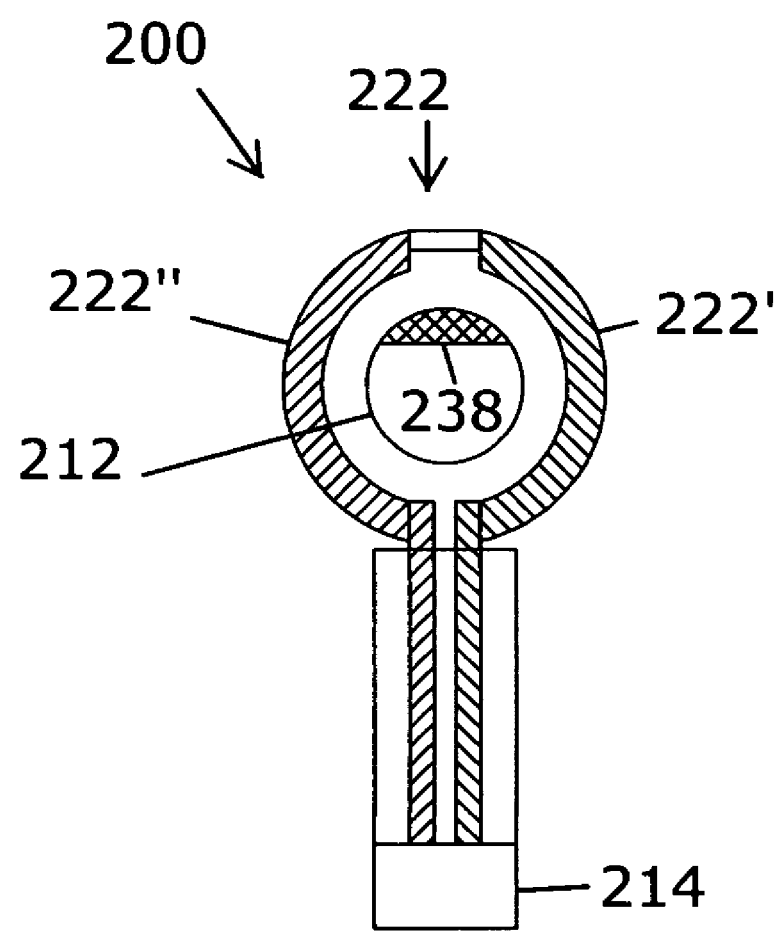
Figure 8:
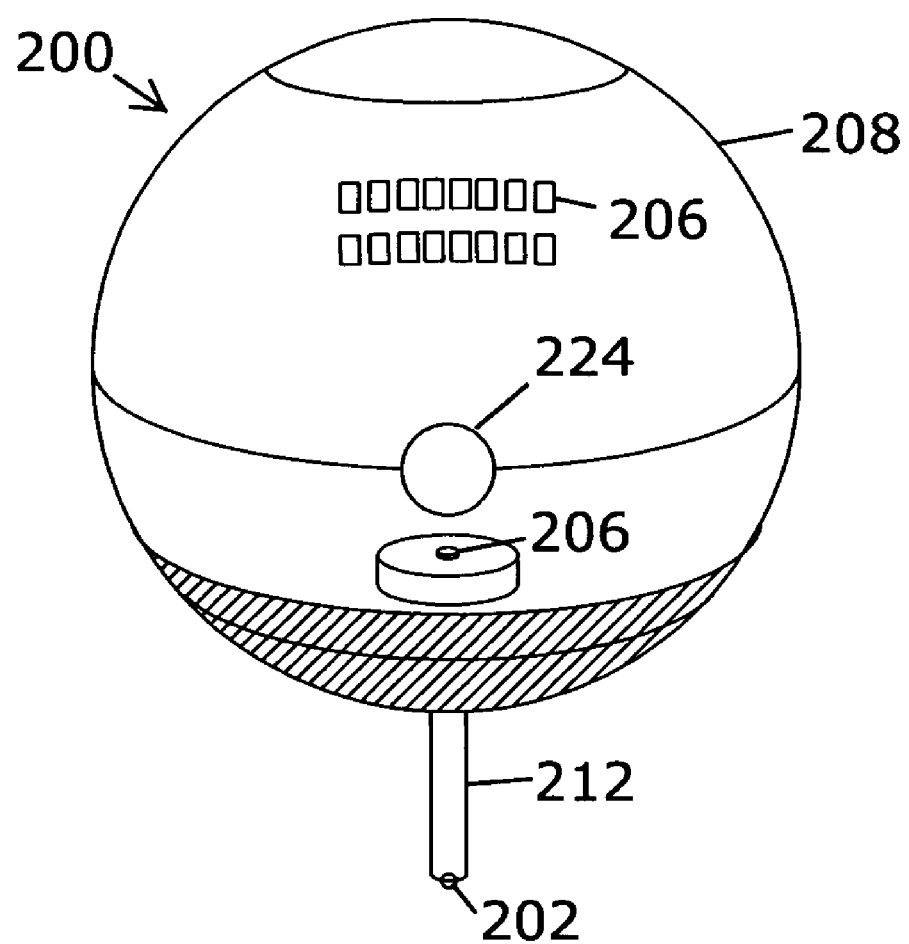
Figure 9:
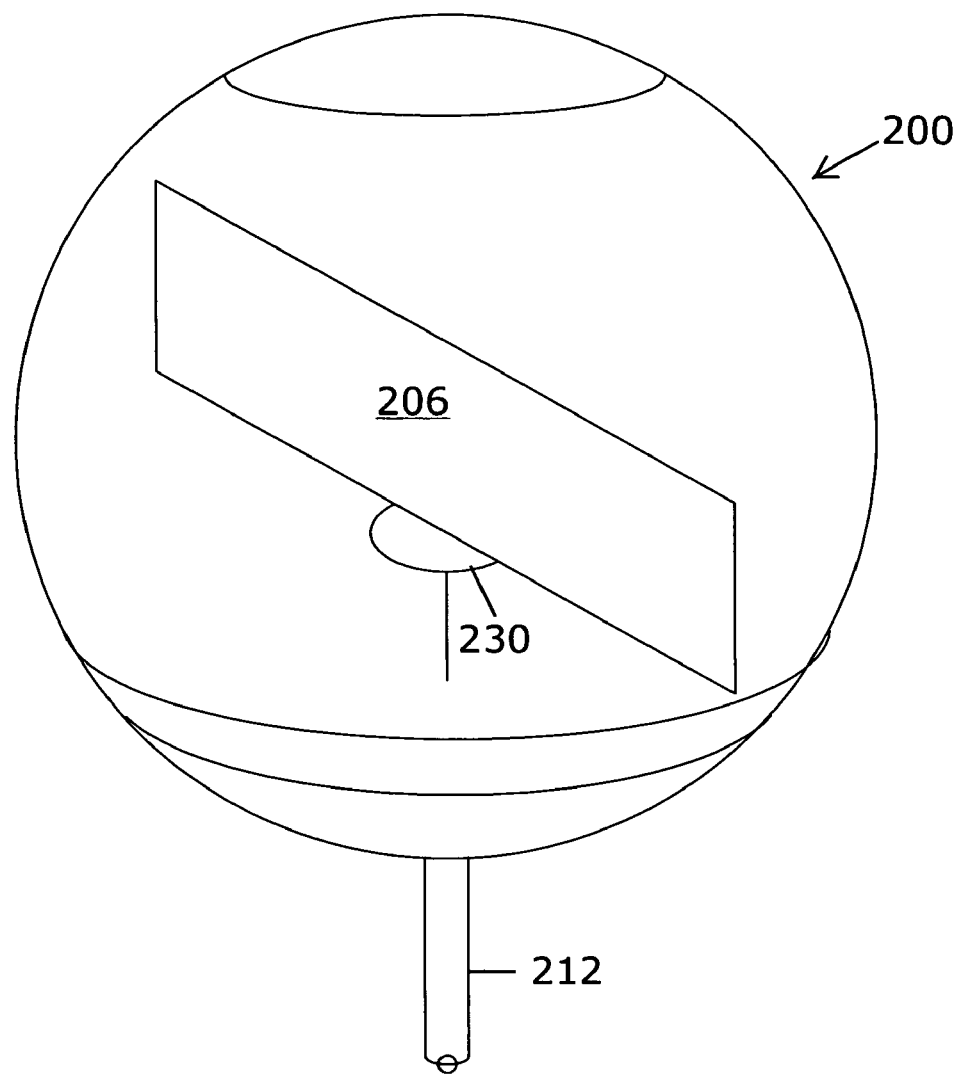
Figure 10:
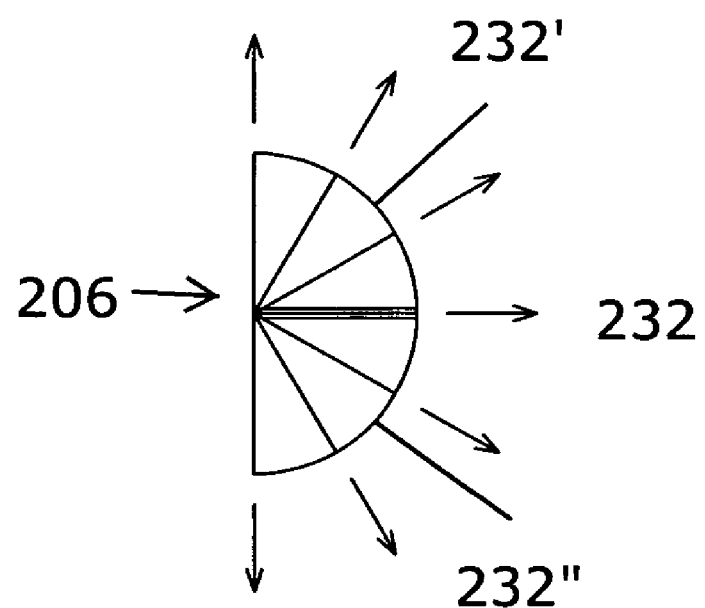
Figure 11:
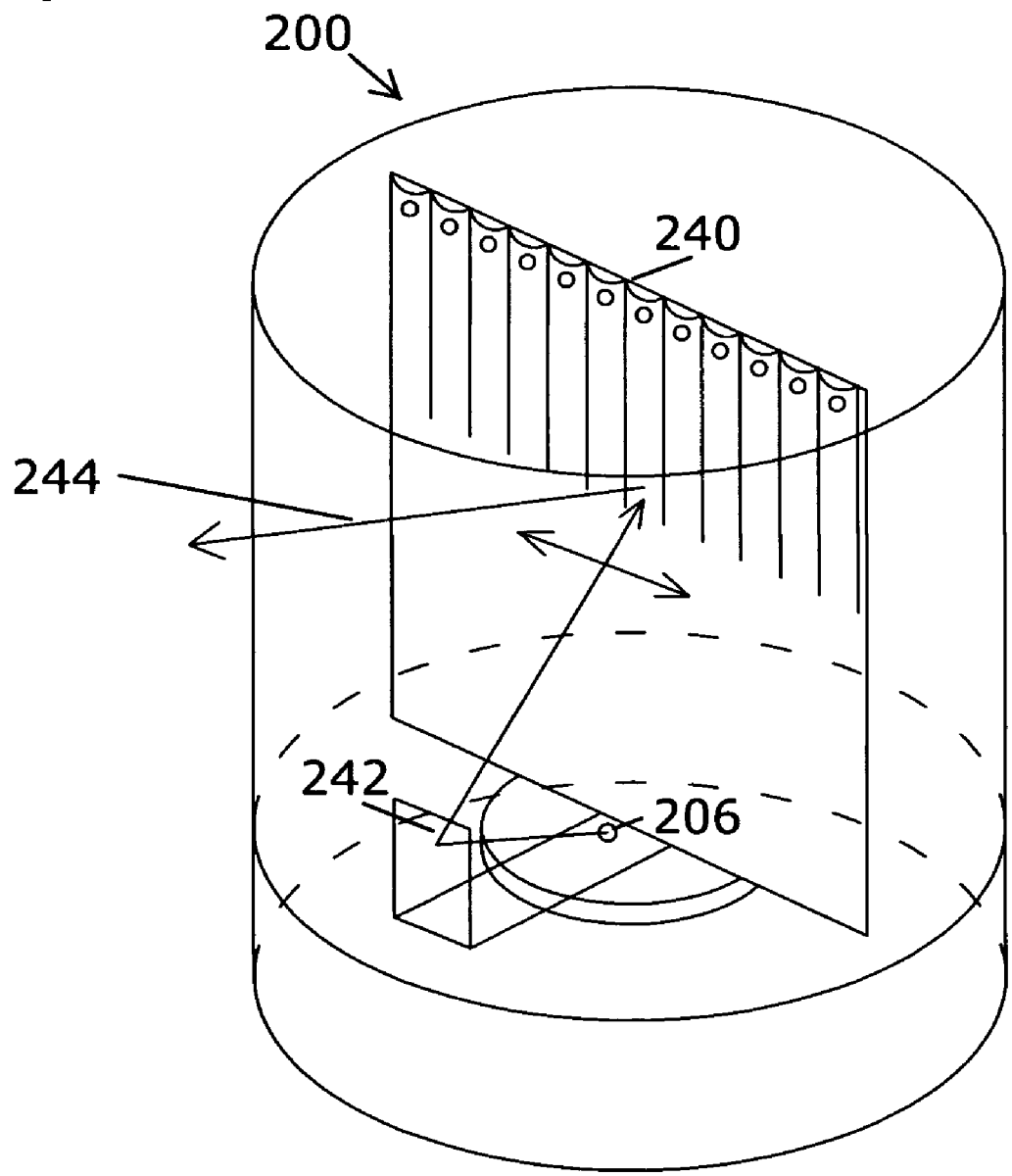
Figure 12:
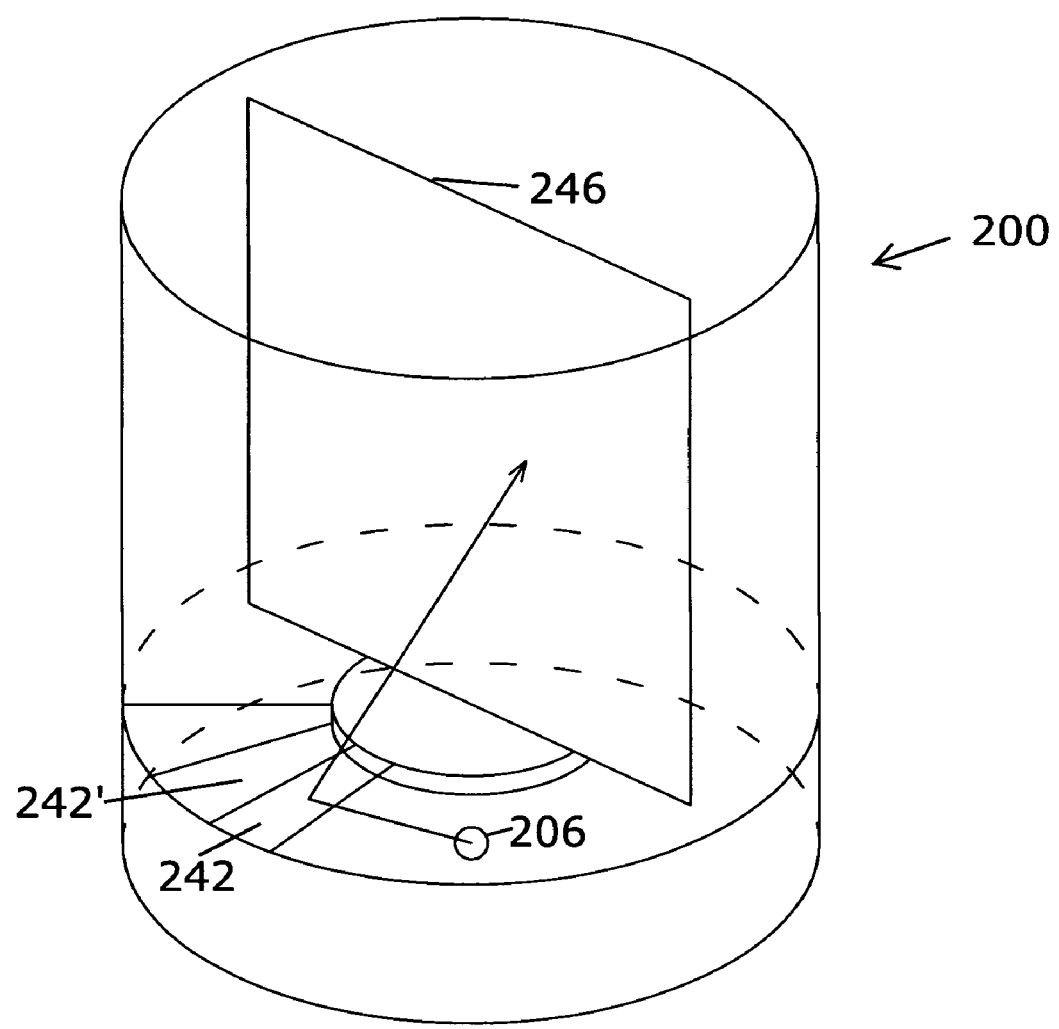
Figure 13:
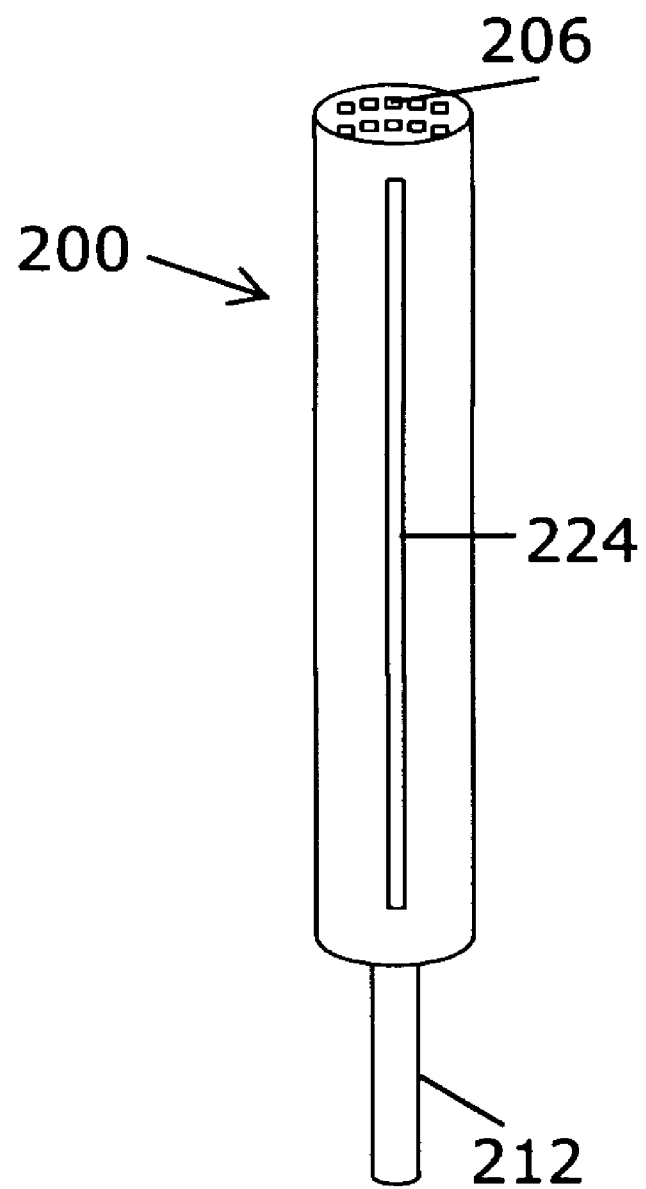
Figure 14:
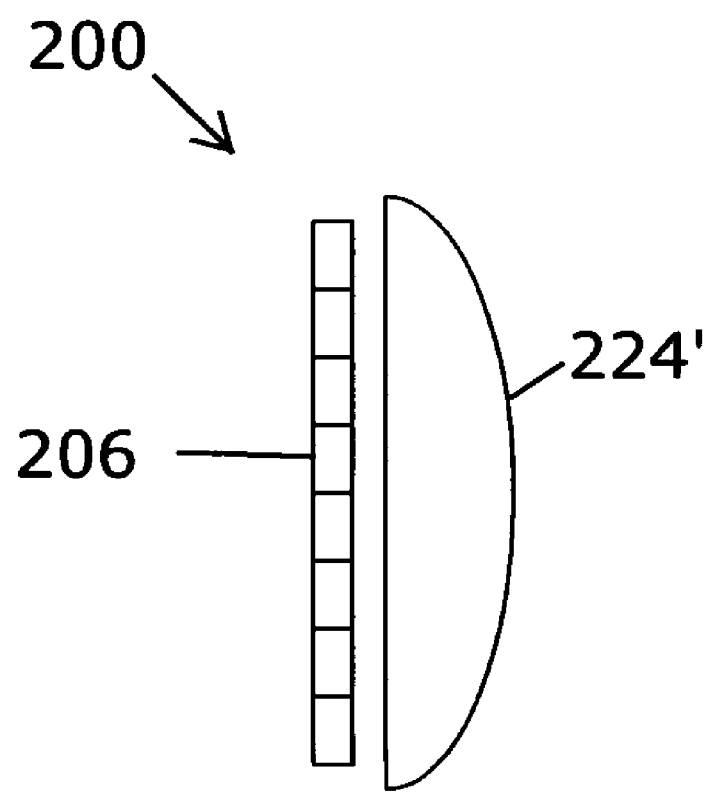
Figure 15:
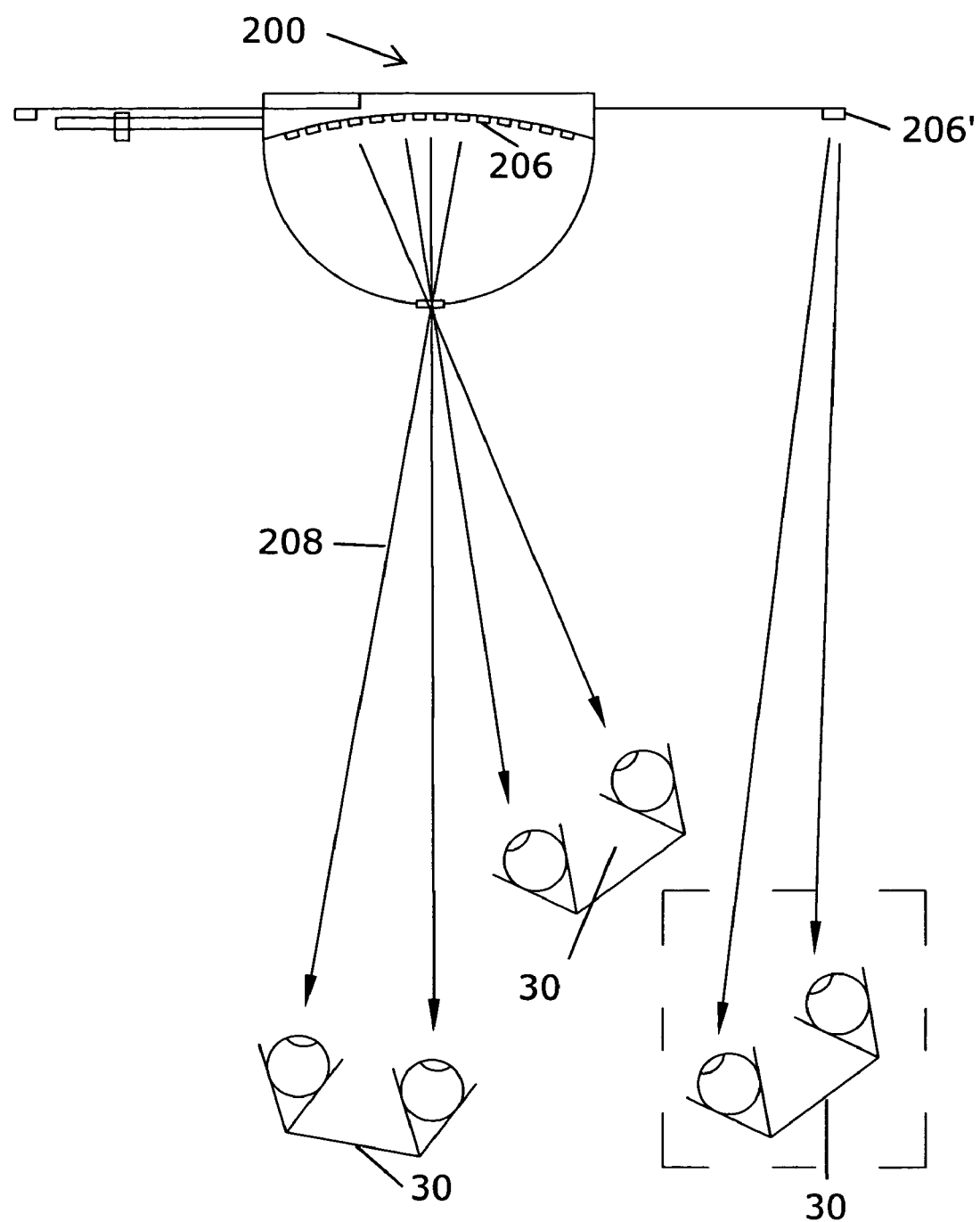
Figure 16:
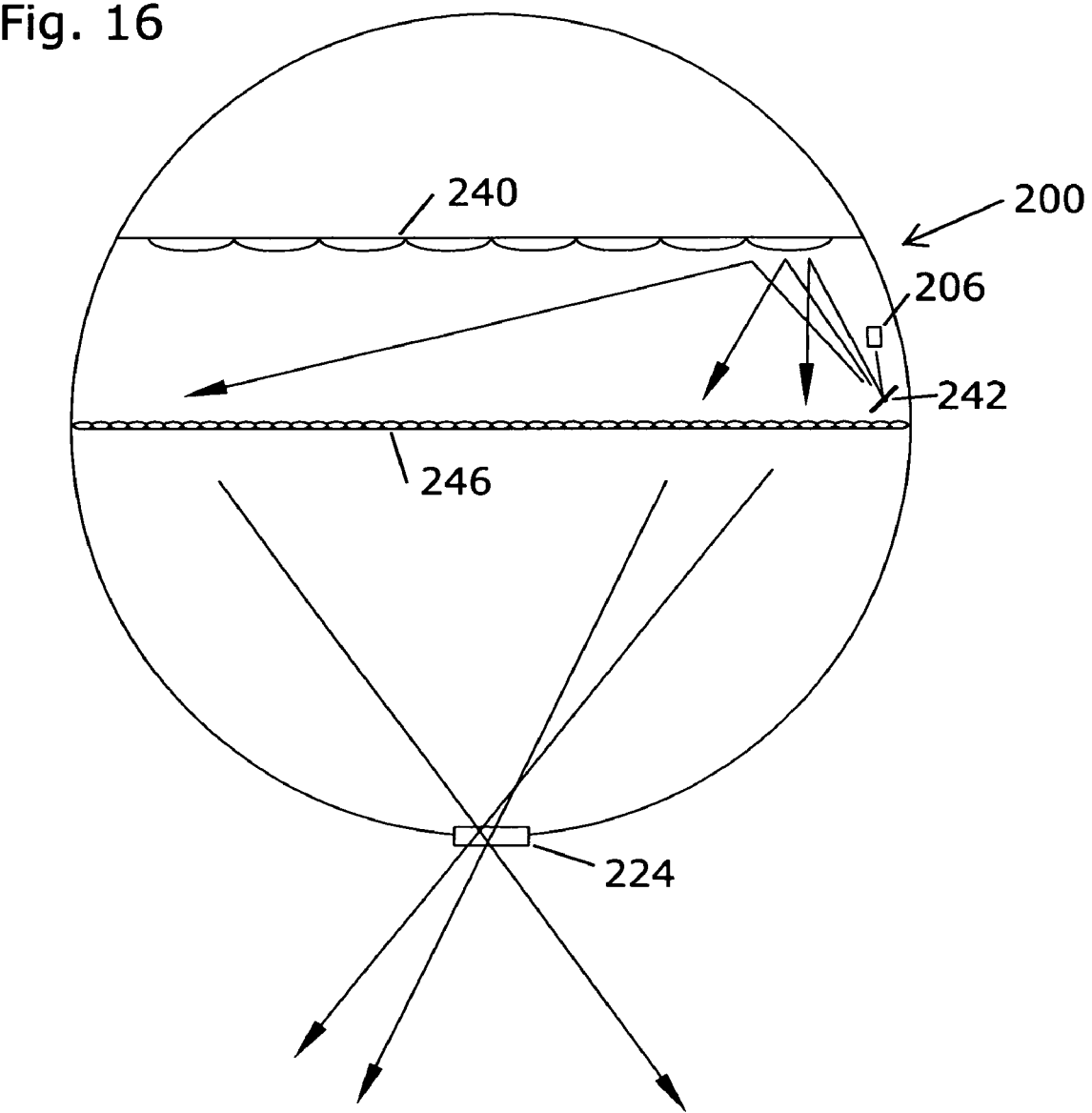
Figure 17:
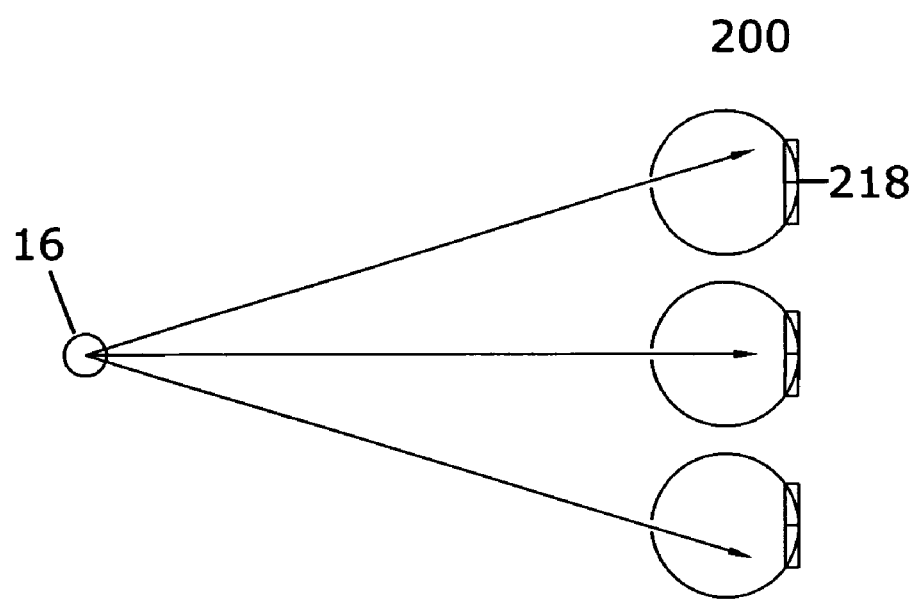
Figure 18:
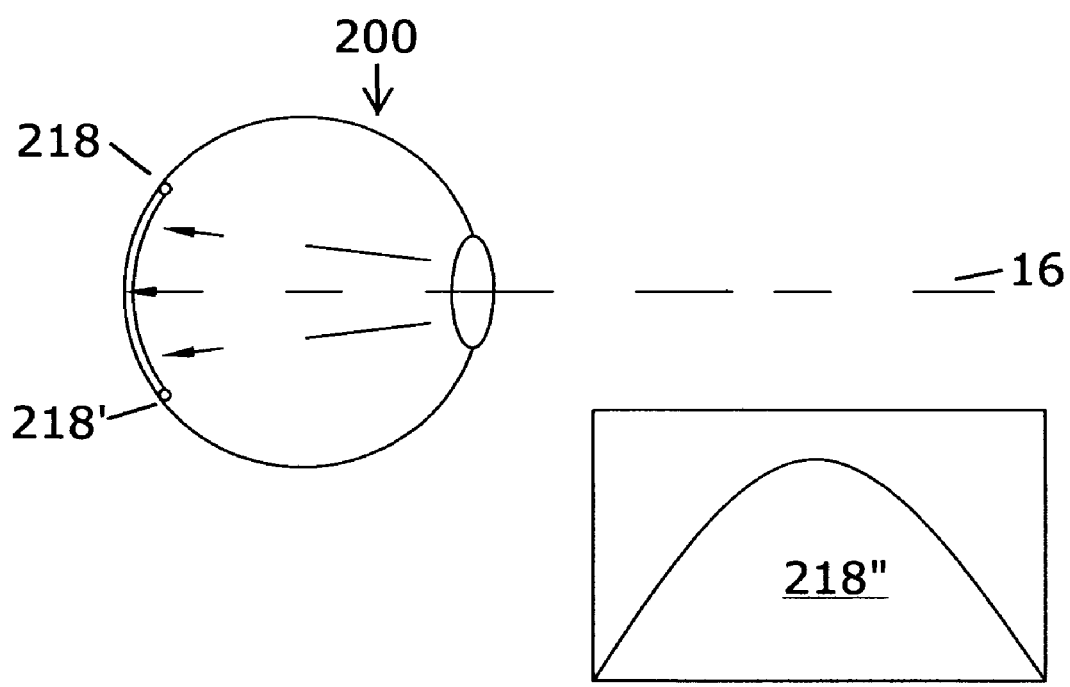
Figure 19:
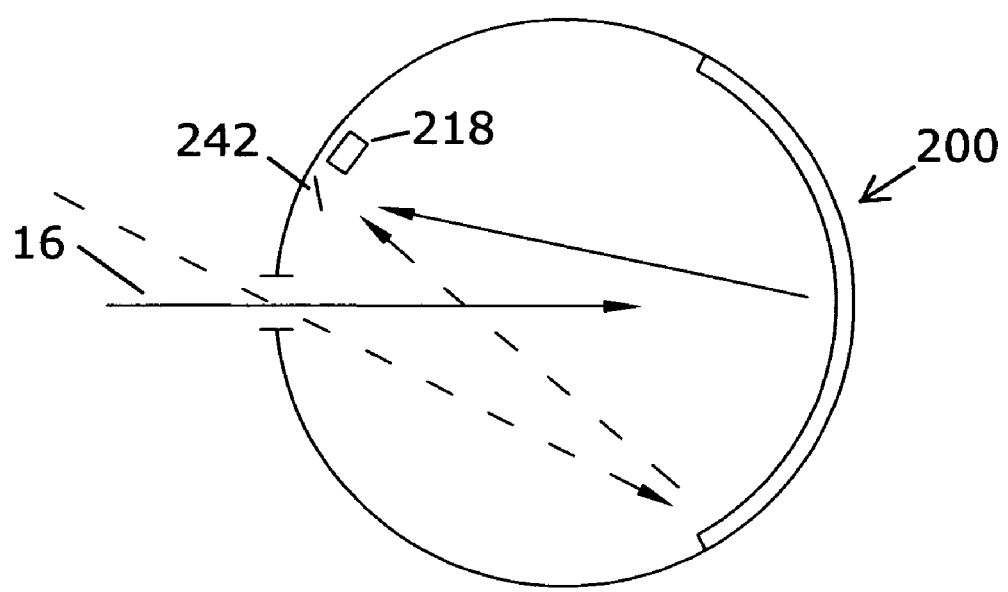
Figure 20:
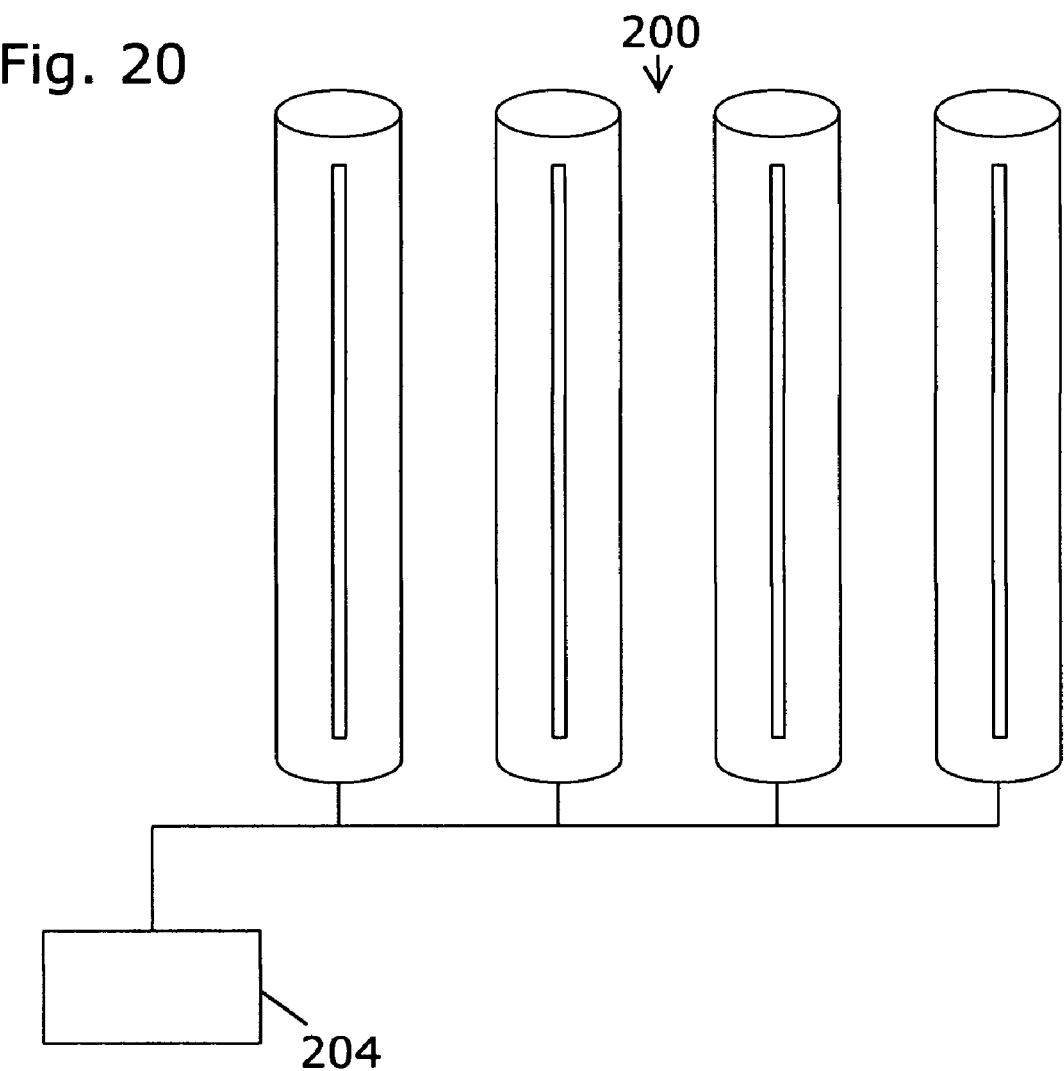
Figure 21:
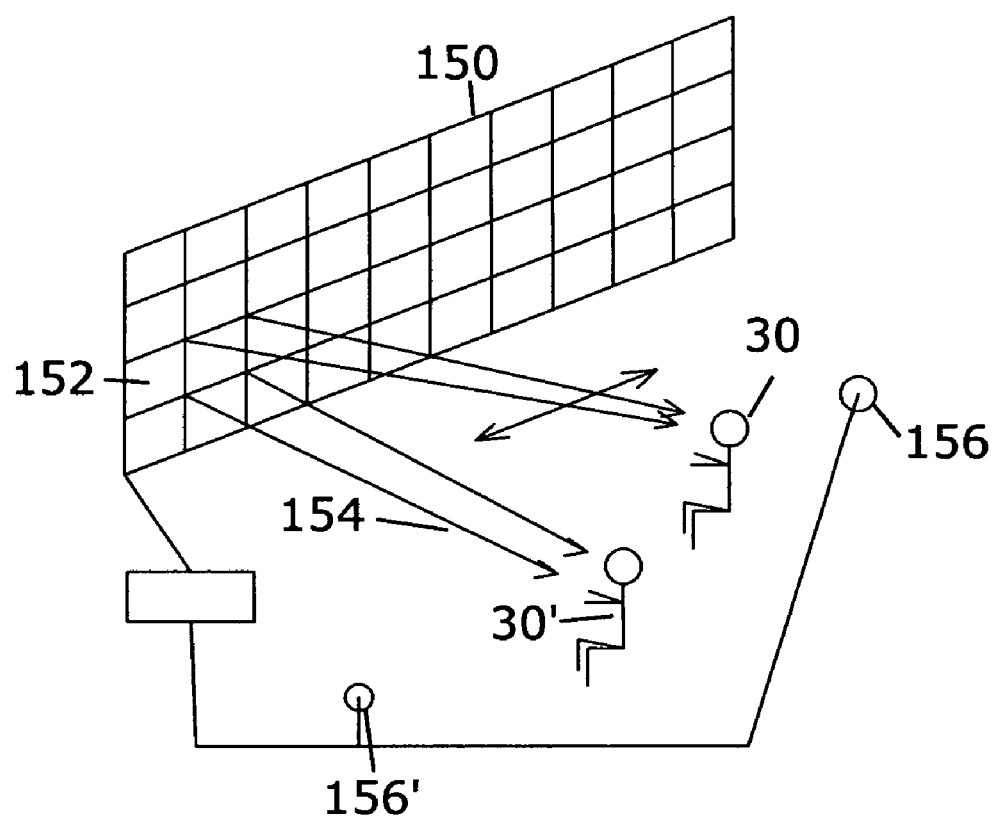
Figure 22:
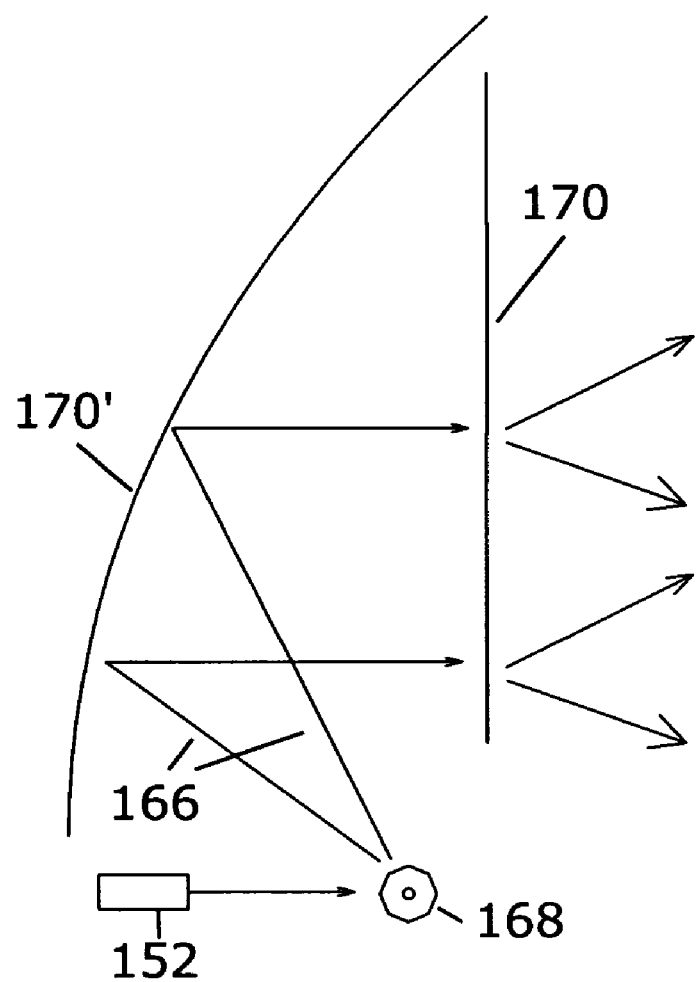
Figure 23:
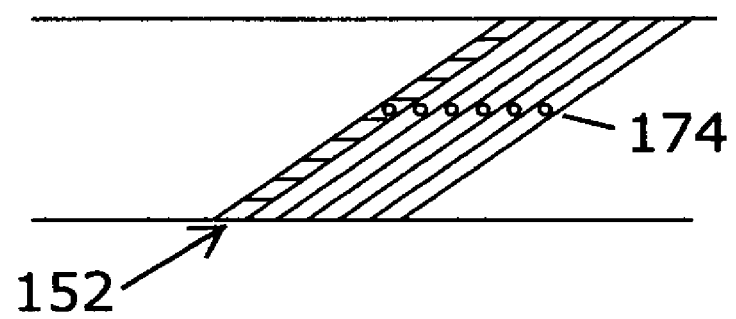
Figure 24:
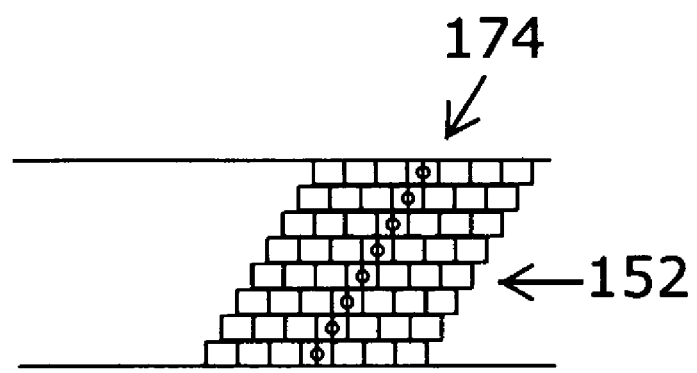
Figure 25:
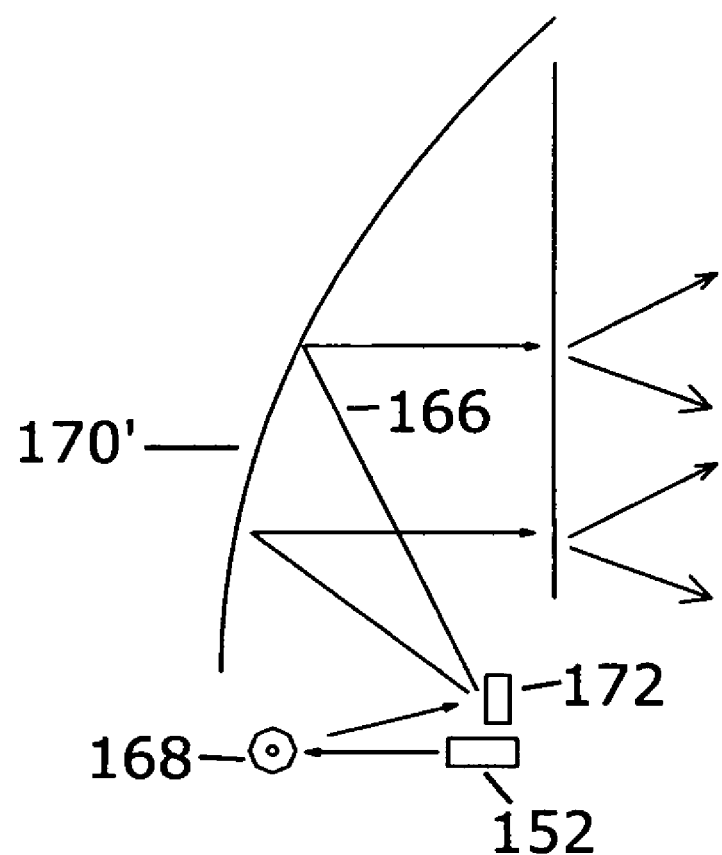
Figure 26:
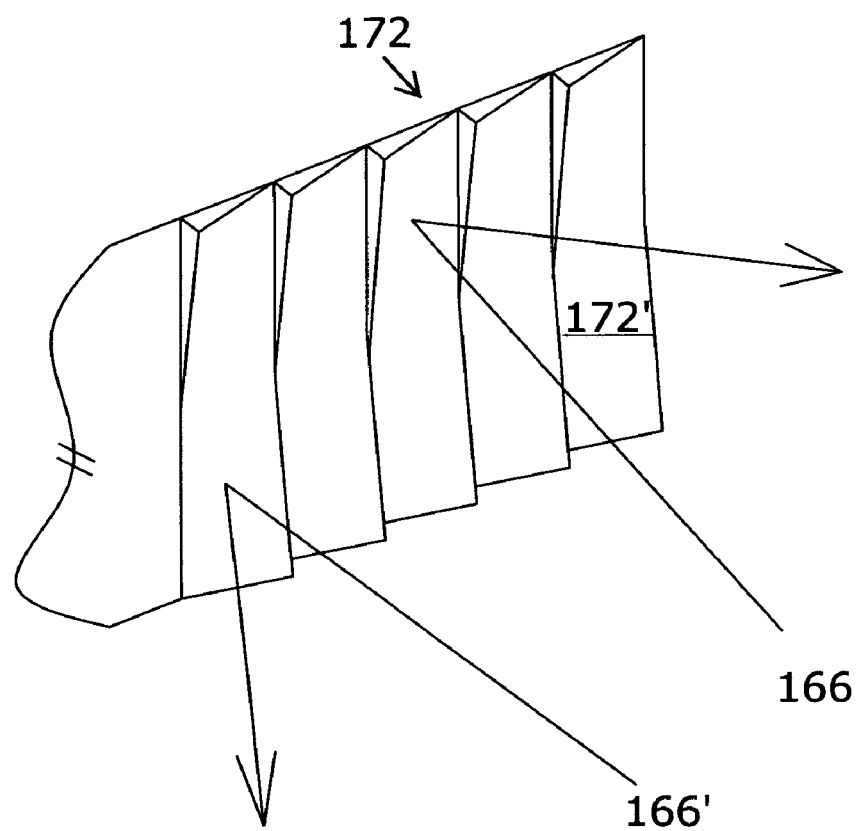
Figure 27:
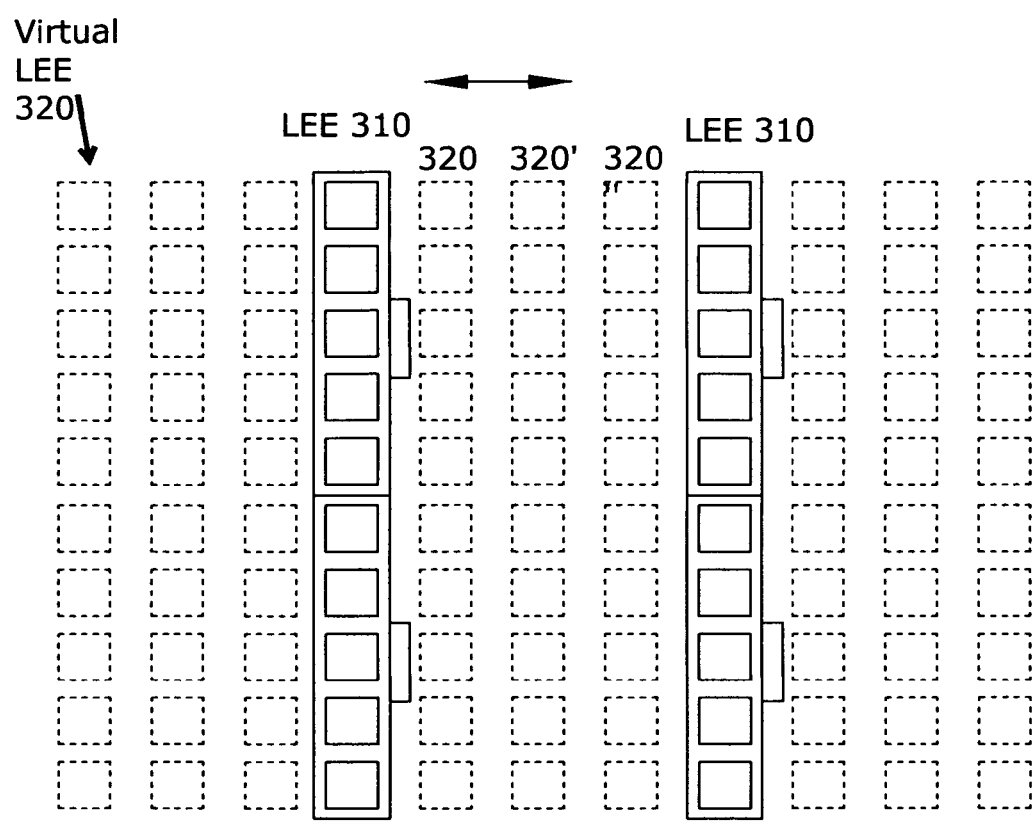
Figure 28:
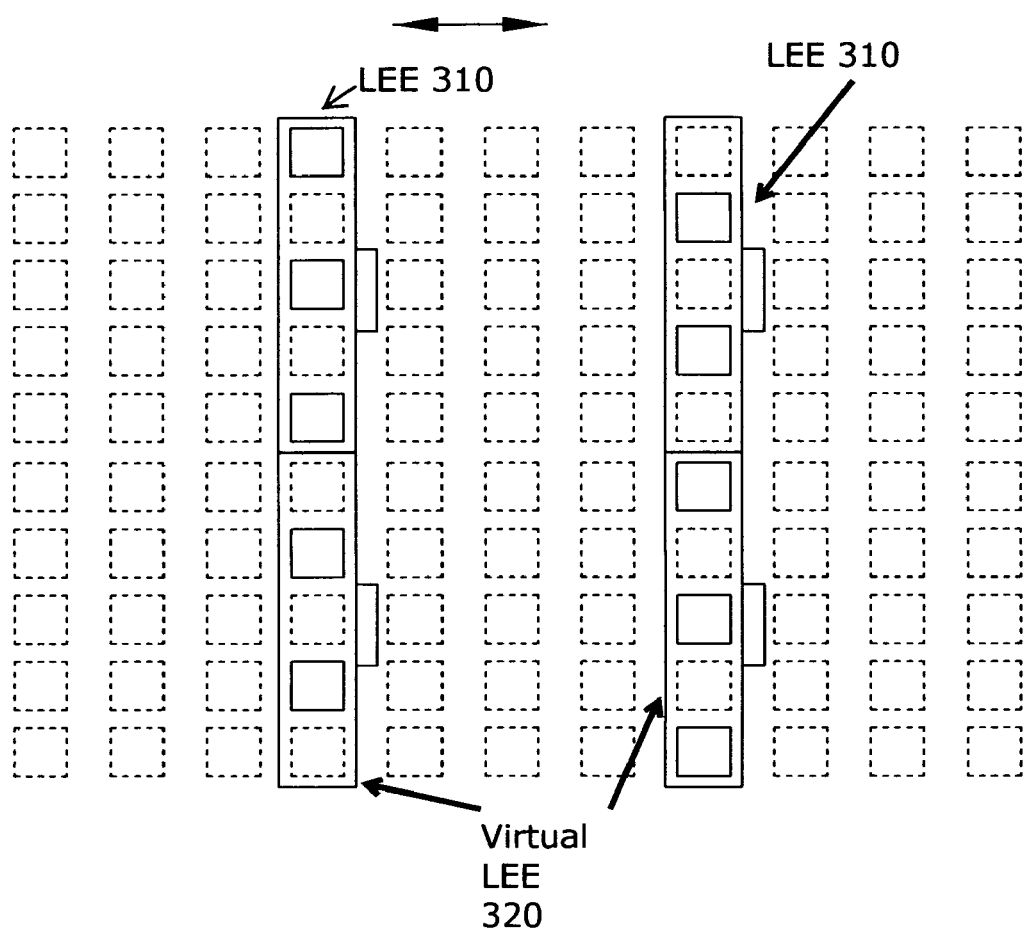
FIG. 28 illustrates an alternate spacing of LEE 310 within the respective columns by staggering the placement of the LEE 310 and increasing the number of contiguous virtual LEEs 320 by a factor of 2 plus 1. Other patterns more be employed.
Figure 29:
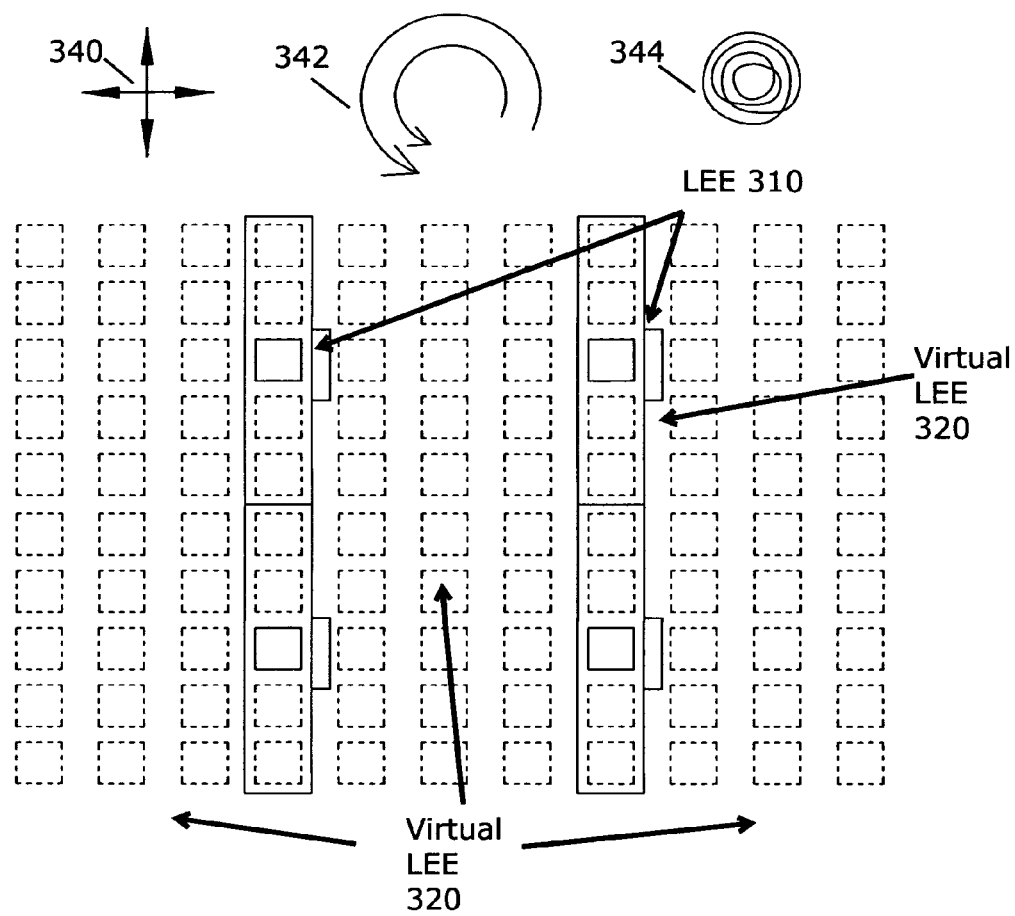
FIG. 29 illustrates another alternate spacing of LEE 310 within the respective columns by reducing the number of LEEs 310 in both the horizontal and vertical dimensions. The virtual LEEs 320 may be presented in a Cartesian 340, circular expanding 342, spiral pattern 344 or other pattern.
Figure 30:
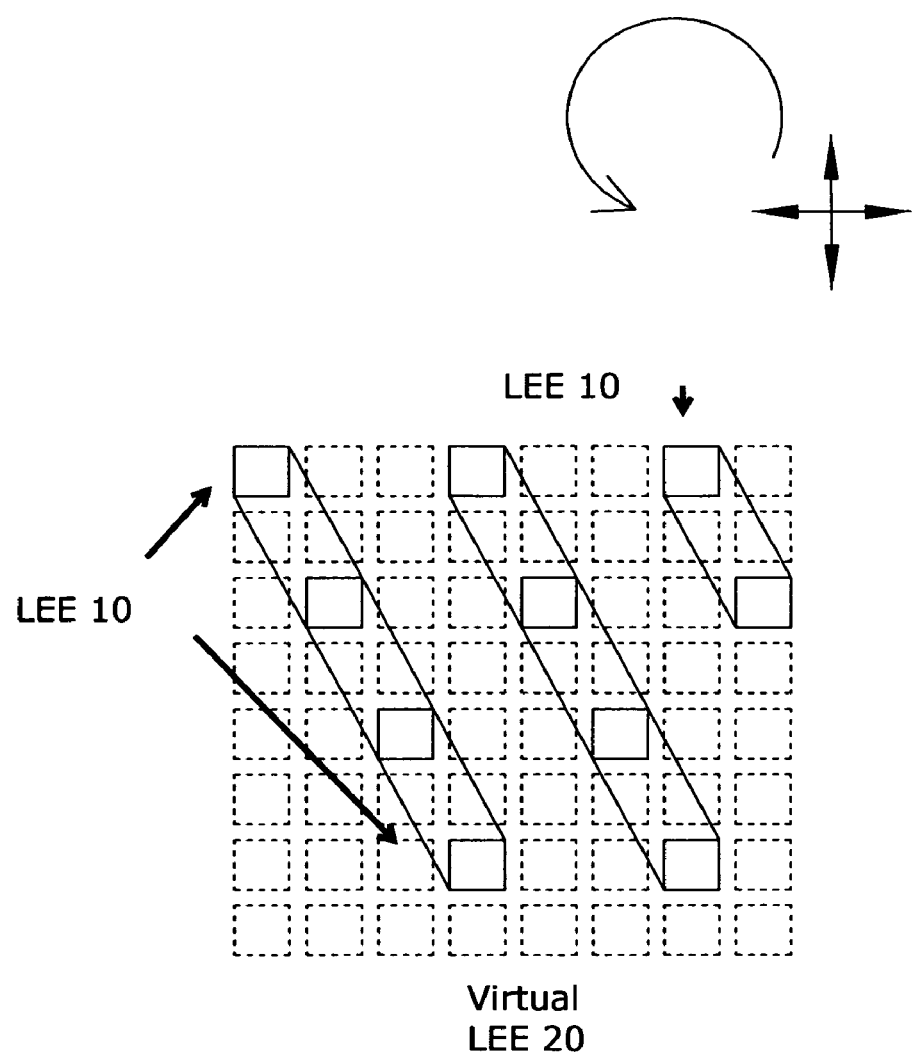
FIG. 30 illustrates a diagonal, staggered spacing of LEEs 310 within the respective columns reducing the number of LEEs 310 in both the horizontal and vertical dimensions. The virtual LEEs 320 may be presented in a Cartesian 340, circular expanding 342, spiral pattern 344 or other pattern.

In operation, the resolution enhanced embodiments of the present invention overlay the display, which may any visual form (i.e. static, moving, video, text, abstract, etc.) image onto the matrix produced by the real 310 and virtual 320 light emitters, and sequentially illuminates the real LEE 10 with the corresponding real and virtual display pixels in accordance with the display patterns presented.

When applied in the manner of Duffy, the real LEE 310 is moved to the corresponding virtual pixel location. When applied in the manner of Bell, the virtual (or intermediate) pixels are sequentially displayed on the real static LEE 310, and the human visual system, by saccadic, cognitive or combinations of both, intercalates the virtual pixels and integrates the image.

The quality of the integration may be influenced by controlling the timing and luminosity of the display. Representative patterns include but not limited to:
1. Alternating direction and interlacing the rows
2. Using opposite circular directions
3. Employing a random
4. Weighting the motion by subject—saccadic pre-testing
   i. Analysis
      1. Delta values
         a. Subject content
         b. Luminosity
         c. Chromaticity Weighting the motion by subject provides substantial improvement in the perception of visual quality in part due to the integrative synthesis corresponding to the natural saccadic response. The method may be applied to pre-recorded images by using eye-tracking (eye-tracking devices are well known) on representative observer(s) to identify and quantify the visual highlight inducing the temporal saccade, and locally increasing the resolution, directing the motion and modulating the timing of intercalated images in response. Increasingly, real-time algorithms may be applied.

The aforementioned embodiments may be applied to two-dimensional or virtual 3D displays as shown in various display embodiments in these applications. These displays may be affixed to a structure or vehicle, attached to a mesh or backdrop screens or handheld.

Figure 31:
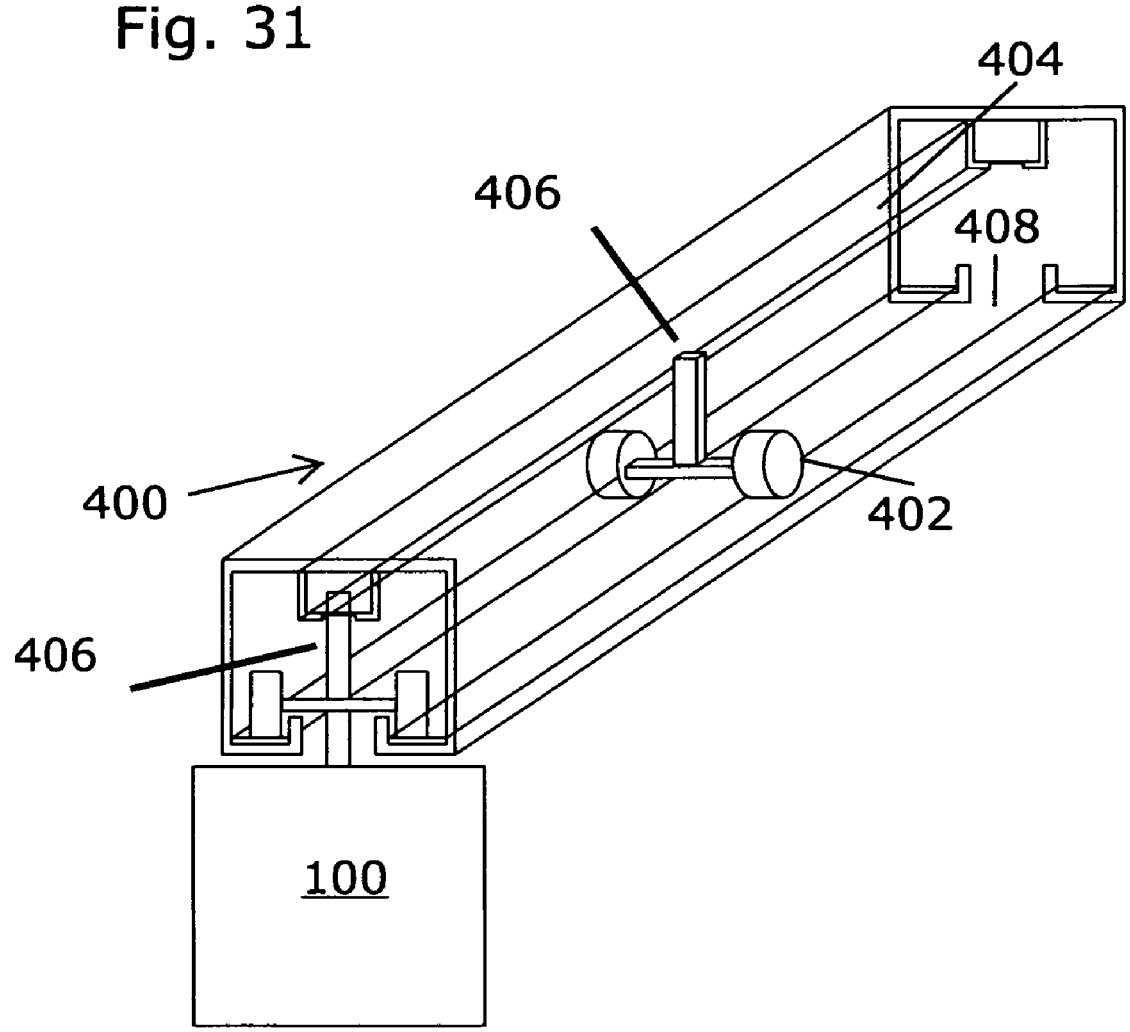

FIG. 31 presents an automated track embodiment of the present invention where the projector 100 is movably affixed to a track system 400 having a carriage 402 with the option of motorized wheels controlled by a computer in each projector and communicating to the other projectors and a central controller by sliding contacts on the track. The electrical contacts may be through the wheels, suspending arms or independent brushes. The track may contain two or more power and communication channels. Communication may be through the power channels (X10) or through one or more separate lines.

Carriages are well-known and include those used for trussing, curtain movement, conveyers and other devices.

An improved optical communications system may be employed where the track 400 contains an reflective optical channel or conduit 404 having a opening 408 into which a projector transceiver probe 406 may be inserted. A reflective foil flap may close around the transceiver 406 probe. In operation, the optical communications signal is transmitted down the channel 404 and partially intercepted by the transceiver probe 406, which occludes only a small percentage of the cross-sectional area of the channel. Thus, multiple projectors 100 may be affixed to the track and simultaneously controlled and moved.

The system may include optical repeaters at designated intervals, and modular sections of any shape or path.

Integrated with the other elements of the present invention, the track further automates the performance display system.

The embodiments of the invention particularly disclosed and described herein above is presented merely as examples of the invention. Other embodiments, forms and modifications of the invention coming within the proper scope and spirit of the appended claims will, of course, readily suggest themselves to those skilled in the art.

Notes
1. One or more Simultaneously-Emitting, Multiple-Directional Projecter(s) to a Multiplicity of Undifferentiated Display Elements
    1.1. Handheld Display Element
        1.1.1. Daytime
        1.1.2. Nighttime
2. Projector Beam
    2.1. Invisible (IR, UV)
    2.2. Visible
    2.3. Ultrasound
    2.4. RF
3. Projector Beam
    3.1. Invisible (IR, UV)
    3.2. Visible
    3.3. Ultrasound
    3.4. RF
4. Projector as Display Wall
    4.1. Continuous Beam Scanning (x-y)
    4.2.
5. Projector is Compact (Portable)
6. Projectors are Robotic
    6.1. On track
        6.1.1. Track has position information
        6.1.2. Track has communication channel
        6.1.3. Projectors are wireless
        6.1.4. Track is suspension cables
        6.1.5. Projectors have position locking—(for transport)
    6.2. Independent
        6.2.1. On Wheels
        6.2.2. Airborne
7. Projector as Luminaire
    7.1. Static
    7.2. Moving
8. VI
    8.1. Single Scan—Occlusion
    8.2. Single Scan—AS
    8.3. Multiple Scan—Both
    8.4. Active Multiplier
        8.4.1. Reflective
        8.4.2. Transmissive
    8.5. Passive Multiplier
        8.5.1. Reflective
        8.5.2. Transmissive

PARTS

| | |
|---|---|
| 10 | Performance System |
| 12 | PS Computer |
| 14 | PS Data Network |
| 16 | PS Global Reference Receiver/Beacon' |
| 18 | PS Control Board/Instrument |
| 20 | Venue |
| 22 | Audience |
| 24 | Stage |
| 30 | Observer's Eyes |
| 32 | Observer's Eyes |
| 100 | Data/Image Projector |
| 102 | Data Emitter |
| 104 | Visible Light Emitter |
| 106 | Direction Data Beam |
| 108 | Visible Light Beam |
| 110 | Data Modulator |
| 112 | Visible Light Modulator |
| 114 | Combiner |
| 118 | Lens System |
| 120 | Scanning System |
| 122 | Mounting System |
| 124 | Projected Image |
| 126 | Motion Adjusted Image |
| 128 | Orientation Sensor |
| 150 | Projector Wall |
| 152 | Projector Wall Matrix Element |
| 154 | Projection Line |
| 30 | Observers Eye |
| 156 | Projection Scan Limits Feedback sensors |
| 166 | Pre-scanner Beam |
| 168 | Scanner |
| 170 | Viewer Screen (horizontal lenticular, for example) |
| 172 | Autoview Optics |
| 200 | Audience Unit |
| 202 | AU Communication Receiver |
| 204 | AU Computer |
| 206 | AU Light Emitter/Modulator |
| 208 | AU Sound Emitter |
| 210 | AU Power Source |
| 212 | AU Handle |
| 214 | AU Connecting member |
| 218 | Orientation Sensor/Receiver |
| 220 | Pressure Contact for Registration |
| 222 | Switch/sensor |
| 224 | View Aperture (Integral Photographic Autostereography) |
| 226 | Weight |
| 228 | Balloon/Ball |
| 230 | Rotating Motor with Position Encoder |
| 232 | Light element projection sectors |
| 238 | Handle Contact |
| 240 | Scan Multiplier Lenticular Array |
| 242 | Scanner |
| 244 | Directional Beams |
| 246 | Image Screen ( |

What I claim is:

1. An autostereoscopic performance effects system comprising:
    a) a control board having means to transmit a series of commands to a projector,
    b) said projector having means to receive said series of commands from said control board and having means to project at least one directional signal to at least one of a plurality of audience unit receivers,
    c) said at least one of a plurality of audience unit receivers having means to receive said at least one directional signal and emit a designated response,
    d) an audience unit displaying at least one pixel of autostereoscopic pattern and wherein said at least one of a plurality of audience unit receivers further includes means to shift said autostereoscopic pattern in relation to an orientation of the at least one of a plurality of audience unit receivers.

2. A beam holographic performance display system comprising:
    a) a control computer having means to transmit a series of commands to a projector matrix,
    b) said projector matrix having means to receive said series of commands from said control computer and having means to project at least one directional signal to at least one of a plurality of audience units,
    c) wherein said projector matrix further include means to increase perceived resolution by saccadic patterns.

3. A beam holographic performance display system in accordance with claim 2, wherein said projector matrix further includes transform means having a series of curved optical elements.

4. An autostereoscopic performance effects system comprising:
   a) a control board having means to transmit a series of commands to a projector,
   b) said projector having means to receive said series of commands from said control board and having means to project at least one directional signal to at least one of a plurality of audience unit receivers,
   c) said at least one of a plurality of audience unit receivers having means to receive said at least one directional signal and emit a designated response,
   d) an audience display unit having an integrated Autoview optics, wherein said audience unit displaying at least one pixel of autostereoscopic pattern.

* * * * *